United States Patent
BV et al.

(10) Patent No.: US 12,027,184 B2
(45) Date of Patent: Jul. 2, 2024

(54) AUTO-GENERATING VIDEO TO ILLUSTRATE A PROCEDURAL DOCUMENT

(71) Applicant: ADOBE INC., San Jose, CA (US)

(72) Inventors: Suryateja BV, Hyderabad (IN); Prateksha Udhayanan, Bangalore (IN); Parth Satish Laturia, Maharashtra (IN); Chauhan Dev Girishchandra, Surat (IN); Darshan Khandelwal, Jaipur (IN); Stefano Petrangeli, San Francisco, CA (US); Balaji Vasan Srinivasan, Bangalore (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/661,614

(22) Filed: May 2, 2022

(65) Prior Publication Data
US 2023/0352055 A1    Nov. 2, 2023

(51) Int. Cl.
| | |
|---|---|
| G11B 27/036 | (2006.01) |
| G06F 16/41 | (2019.01) |
| G06F 40/20 | (2020.01) |
| G06F 40/30 | (2020.01) |
| G06N 3/0464 | (2023.01) |
| G06N 3/0895 | (2023.01) |
| G06N 5/01 | (2023.01) |

(Continued)

(52) U.S. Cl.
CPC ............ *G11B 27/036* (2013.01); *G06F 16/41* (2019.01); *G06F 40/20* (2020.01); *G06F 40/30* (2020.01); *G06N 5/01* (2023.01); *G06V 10/764* (2022.01); *G06V 10/774* (2022.01); *G10L 13/02* (2013.01); *G11B 27/34* (2013.01)

(58) Field of Classification Search
None
See application file for complete search history.

(56) References Cited

U.S. PATENT DOCUMENTS

| | | | |
|---|---|---|---|
| 2007/0101259 A1* | 5/2007 | Grigoriadis | G06F 40/106 715/205 |
| 2010/0302254 A1* | 12/2010 | Min | G06F 40/109 345/473 |

(Continued)

OTHER PUBLICATIONS

Fu, Tsu-Jui, et al., "DOC2PPT: Automatic Presentation Slides Generation from Scientific Documents," arXiv preprint arXiv:2101.11796 (2021), 16 pages.

(Continued)

*Primary Examiner* — Hung Q Dang
(74) *Attorney, Agent, or Firm* — F. CHAU & ASSOCIATES, LLC

(57) ABSTRACT

Systems and methods for video processing are configured. Embodiments of the present disclosure receive a procedural document comprising a plurality of instructions; extract a plurality of key concepts for an instruction of the plurality of instructions; compute an information coverage distribution for each of a plurality of candidate multi-media assets, wherein the information coverage distribution indicates whether a corresponding multi-media asset relates to each of the plurality of key concepts; select a set of multi-media assets for the instruction based on the information coverage distribution; and generate a multi-media presentation describing the procedural document by combining the set of multi-media assets based on a presentation template.

17 Claims, 16 Drawing Sheets

(51) Int. Cl.
*G06V 10/764* (2022.01)
*G06V 10/774* (2022.01)
*G10L 13/02* (2013.01)
*G11B 27/031* (2006.01)
*G11B 27/34* (2006.01)
*H04N 21/234* (2011.01)
*H04N 21/8405* (2011.01)
*H04N 21/845* (2011.01)

(56) References Cited

U.S. PATENT DOCUMENTS

| | | | | |
|---|---|---|---|---|
| 2013/0187927 | A1* | 7/2013 | Weinmann | G09B 5/06 345/473 |
| 2014/0229810 | A1* | 8/2014 | Ramanathan | G06F 40/169 715/202 |
| 2015/0131973 | A1* | 5/2015 | Rav-Acha | G11B 27/02 386/285 |
| 2016/0014482 | A1* | 1/2016 | Chen | H04N 21/8456 386/241 |
| 2017/0098324 | A1* | 4/2017 | Srinivasan | G06F 40/109 |
| 2020/0034384 | A1* | 1/2020 | Zou | G06F 16/953 |
| 2020/0382841 | A1* | 12/2020 | Gupta | H04N 21/84 |

OTHER PUBLICATIONS

Chi, Peggy, et al., "Automatic Video Creation From a Web Page," Proceedings of the 33rd Annual ACM Symposium on User Interface Software and Technology, 2020, 14 pages.

Zhu, Junnan, et al., "MSMO: Multimodal Summarization with Multimodal Output," Proceedings of the 2018 Conference on Empirical Methods in Natural Language Processing, pp. 4154-4164, 2018.

Leake, Mackenzie, et al., "Generating Audio-Visual Slideshows from Text Articles Using Word Concreteness," Proceedings of the 2020 CHI Conference on Human Factors in Computing Systems, 2020, 11 pages.

Yagcioglu, Semih, et al., "RecipeQA: A Challenge Dataset for Multimodal Comprehension of Cooking Recipes," Proceedings of the 2018 Conference on Empirical Methods in Natural Language Processing, (2018), pp. 1358-1368.

Alikhani, Malihe, et al., "CITE: A Corpus of Image-Text Discourse Relations," arXiv preprint arXiv:1904.06286v2 [cs.CL] Apr. 16, 2019, 7 pages.

Zhang, Li, et al., "Reasoning about Goals, Steps, and Temporal Ordering with WikiHow," arXiv preprint arXiv:2009.07690v2 [cs.CL] Dec. 12, 2020, 10 pages.

Bguthrie, John T., et al., "Processing Procedural Documents: A Cognitive Model for Following Written Directions," Educational Psychology Review 3.3 (1991): 249-265.

* cited by examiner

AUTO-GENERATING VIDEO TO ILLUSTRATE A PROCEDURAL DOCUMENT

BACKGROUND

The following relates generally to video generation using machine learning. Video generation refers to the use of a computer to edit and synthesize a set of frames or analyze a video file using an algorithm or a processing network. In some examples, a machine learning model is used to generate a video based on procedural documents. Procedural documents are documents that include a series of steps. In some cases, procedural documents are text-heavy documents providing step-by-step instructions and users often rely on procedural documents to carry out a sequence of steps. In some examples, procedural documents refer to instructional documents such as assembly manual, cooking recipes, etc. In some cases, conventional video generation systems may generate a synthesized output (e.g., a video, slides presentation) comprising audio and visual components based on input text.

However, conventional video generation systems are not able to intelligently select an appropriate combination of multi-modal assets (e.g., text, image, audio, video clip) to illustrate each instruction of a procedural document. Neither do these systems take user preferences for information load into consideration. Therefore, there is a need in the art for an improved video generation system that can automatically synthesize an explanatory video to efficiently illustrate steps in a procedural document to users.

SUMMARY

The present disclosure describes systems and methods for video processing. Embodiments of the present disclosure include a video generation apparatus configured to generate a multi-media presentation (e.g., a synthesized video) representing instructions (e.g., from a procedural document). The synthesized video includes images or videos for each step and accompanying voice-over text of the instructions. In some embodiments, a machine learning model is configured to extract a set of key concepts for an instruction of the procedural document. The machine learning model computes an information coverage distribution for each of a set of candidate multi-media assets, where the information coverage distribution indicates whether a corresponding multi-media asset relates to each of the set of key concepts. The machine learning model selects a set of multi-media assets for each step in a procedure (e.g., step located in a procedural document) based on the information coverage distribution to obtain a plurality of sets of multi-media assets. That is, an information coverage score is computed that enumerates the extent to which each asset covers each key concept in the description of the corresponding step.

A method, apparatus, and non-transitory computer readable medium for video generation are described. One or more embodiments of the method, apparatus, and non-transitory computer readable medium include receiving text of a procedure (e.g., receiving a procedural document) comprising a plurality of instructions; extracting a plurality of key concepts for an instruction of the plurality of instructions; computing an information coverage distribution for each of a plurality of candidate multi-media assets, wherein the information coverage distribution indicates whether a corresponding multi-media asset relates to each of the plurality of key concepts; selecting a set of multi-media assets for the instruction based on the information coverage distribution; and generating a multi-media presentation describing the procedural document by combining the set of multi-media assets based on a presentation template.

A method, apparatus, and non-transitory computer readable medium for training a machine learning model are described. One or more embodiments of the method, apparatus, and non-transitory computer readable medium include receiving a training set comprising a procedural document, wherein the procedural document comprises a plurality of instructions; applying a plurality of heuristic labeling functions to the training set to obtain heuristic label data; classifying each of the plurality of instructions using a modality classifier to obtain predicted label data; comparing the predicted label data to the heuristic label data; and updating parameters of the modality classifier based on the comparison of the predicted label data and the heuristic label data.

An apparatus and method for video generation are described. One or more embodiments of the apparatus and method include a multi-modal encoder configured to encode multi-media assets and instructions from a set of procedural documents; a key concept extraction component configured to extract key concepts from the instructions; an asset selection component configured to compute an information coverage distribution that indicates whether a corresponding multi-media asset of the multi-media assets relates to each of the key concepts in a corresponding instruction and to select a set of multi-media assets for each of the instructions to obtain a plurality of sets of multi-media assets; and a presentation component configured to generate a multi-media presentation by combining the plurality of sets of multi-media assets based on a presentation template.

DETAILED DESCRIPTION

Figure 1:
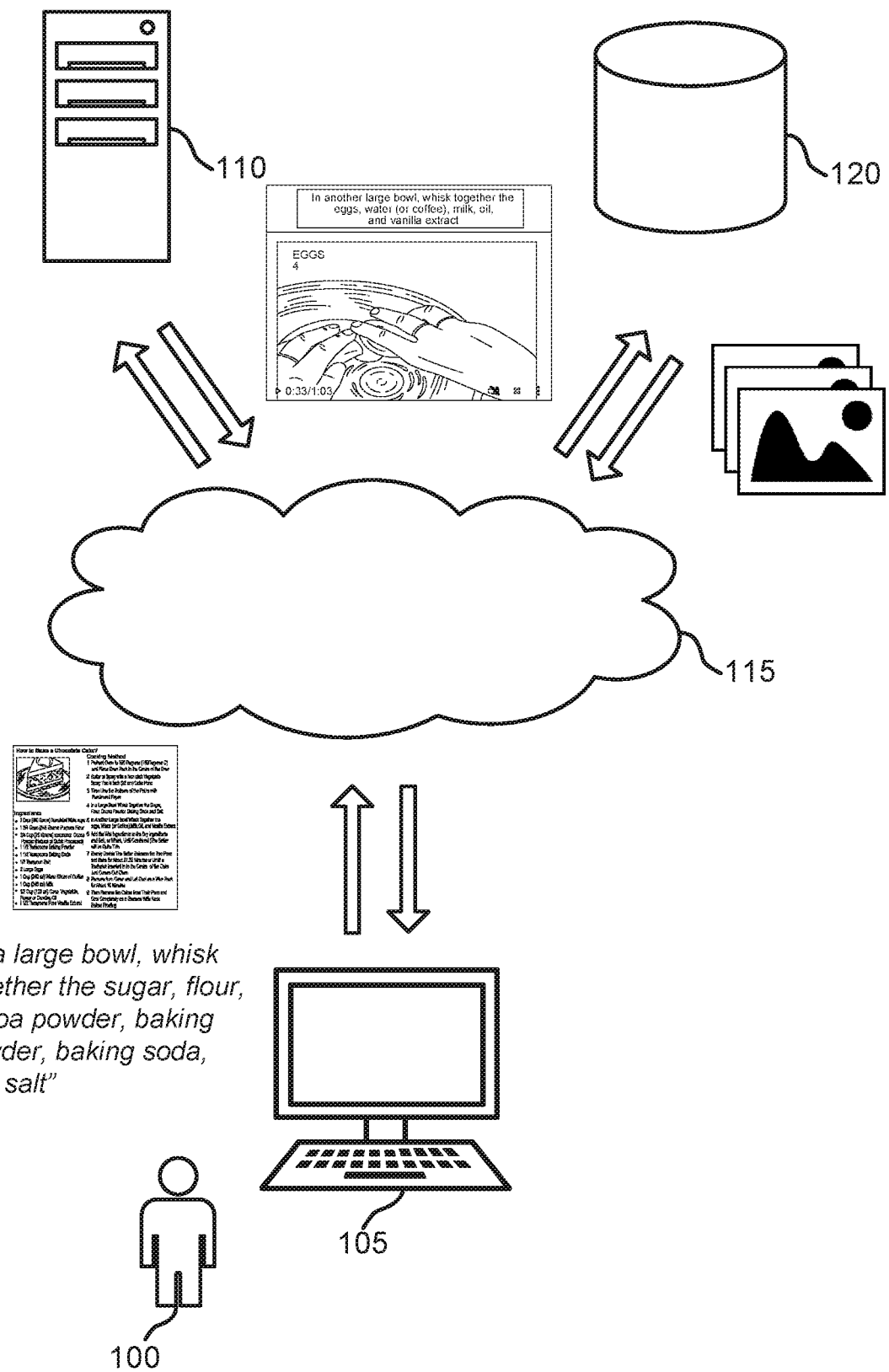
FIG. 1 shows an example of a video generation system according to aspects of the present disclosure.

The present disclosure describes systems and methods for video processing. Embodiments of the present disclosure include a video generation apparatus configured to generate a multi-media presentation (e.g., a synthesized video) representing instructions of a procedure, such as instruction in a procedural document. The synthesized video includes images or videos for each step and accompanying voice-over text of the instructions. In some embodiments, a machine learning model, via an asset selection component, is configured to select a set of multi-media assets for each step in the procedural document to obtain a plurality of sets of multi-media assets. Each multi-media asset of the set of multi-media assets is selected based on an information coverage distribution that indicates whether the multi-media asset relates to each of a set of key concepts in the corresponding instruction. In some examples, a key concept extraction component extracts the set of key concepts by applying a keyword extraction algorithm to the instruction.

Procedural documents often include a long sequence of steps to guide users to reach a goal. In some examples, a procedural document is a cooking recipe or an assembly manual. Some procedural documents may have relatively large number of steps and may be difficult to follow without assistance from non-textual modalities (i.e., image, video). Conventional video generation systems are not able to synthesize content related to procedural documents from different modalities such as images and video clips into a coherent multi-modal representation such as a video. Additionally, some conventional systems fail to intelligently select an appropriate combination of multi-media assets based on semantic understanding and user preferences and generate an output (e.g., a multi-modal illustrative video) that efficiently illustrates the sequence of steps in procedural documents. In some cases, video variants from conventional systems vary at a template level or at the design feature level (e.g., as font or background color) while the assets stay the same.

Embodiments of the present disclosure include a video generation apparatus configured to select multi-modal assets such as text, images, and videos to maximize information coverage of a summary of key concepts a procedural document. The video generation apparatus generates a multi-media presentation (e.g., a video) depicting instructions within the procedural document. An asset selection component of the video generation apparatus is configured to select visuals (e.g., visual media assets such as images or video clips) that maximize information coverage for the procedural document. In some cases, information coverage indicates that the visuals cover all or most of the important concepts of a corresponding instruction of the procedural document. The asset selection component selects a combination of image(s) and video clip(s) to illustrate the corresponding instruction. The asset selection component is configured to measure multi-media assets for their ability to depict the instruction and arrive at a combination of assets to best cover the instruction based in part on corresponding information coverage score. Accordingly, the multi-media presentation generated from the video generation apparatus illustrates steps of a procedure with increased clarity and quality. The multi-media presentation includes an explanatory video comprising a sequence of multi-modal assets that can increase user interaction and understanding of the procedure.

According to at least one embodiment of the present disclosure, the video generation apparatus is configured to classify an instruction and multi-media assets based on a set of temporal relationships. In some examples, relevant temporal relationships comprise "before" step, "during" step, and "after" step. Instructions in the procedural document describe one or more temporal aspects such as the process, the changes in states of the components, the final state that feeds to subsequent instructions. The video generation apparatus searches for multi-media assets for different temporal aspects of the instructions and finds answers to certain questions to determine if a retrieved asset (an image or a video clip) provides information about the preparation, execution, or results of the accompanying step.

In some examples, the video generation apparatus determines asset-instruction (e.g., image-text) temporal relationships based on questions such as (1) whether or not the image (i.e., a multi-media asset) shows how to prepare before carrying out the step; (2) whether or not the image shows the results of the action described in the text; (3) whether or not the image depicts an action in progress described in the text. The video generation apparatus scores all the multi-media assets and their combinations to arrive at the aggregated scores that indicate their ability to capture different temporal aspects. For each (instruction, retrieved asset) pair, the video generation apparatus computes confidence scores corresponding to the three temporal aspects ("before", "during", and "after").

According to an embodiment of the present disclosure, the video generation apparatus chooses a combination of modalities and multi-media assets based on user preferences for information density (i.e., synthesize elaborate or succinct videos). As for users who prefer an elaborate multi-media presentation, the video generation apparatus selects a set of multi-media assets for each instruction in the procedural document, where the set of multi-media assets convey a detailed depiction of the corresponding instruction. In some examples, an elaborate multi-media presentation contains a relatively large number of visual assets with longer duration to account for depiction of prerequisites (such as ingredients for a recipe).

In some embodiments, the video generation apparatus can select an alternate set of multi-media assets for instructions in the procedural document, where the set of multi-media assets conveys a relatively succinct depiction of the corresponding instruction. In some examples, a succinct multi-media presentation contains a relatively small number of assets that cover a large load of information within a short duration.

Embodiments of the present disclosure may be used in the context of video processing applications. For example, a video generation network based on the present disclosure may take a procedural document (e.g., a cooking recipe) and efficiently retrieve, rank candidate multi-media assets, and select a combination of appropriate assets (e.g., image, text, video, audio modalities) for synthesizing an explanatory video. An example application according to embodiments of this disclosure is provided with reference to FIG. 4. Details regarding the architecture of an example video generation apparatus are provided with reference to FIGS. 1-3. Example processes for video generation are provided with reference to FIGS. 4-14. Example training processes are described with reference to FIGS. 15-16.

Network Architecture

Figure 2:
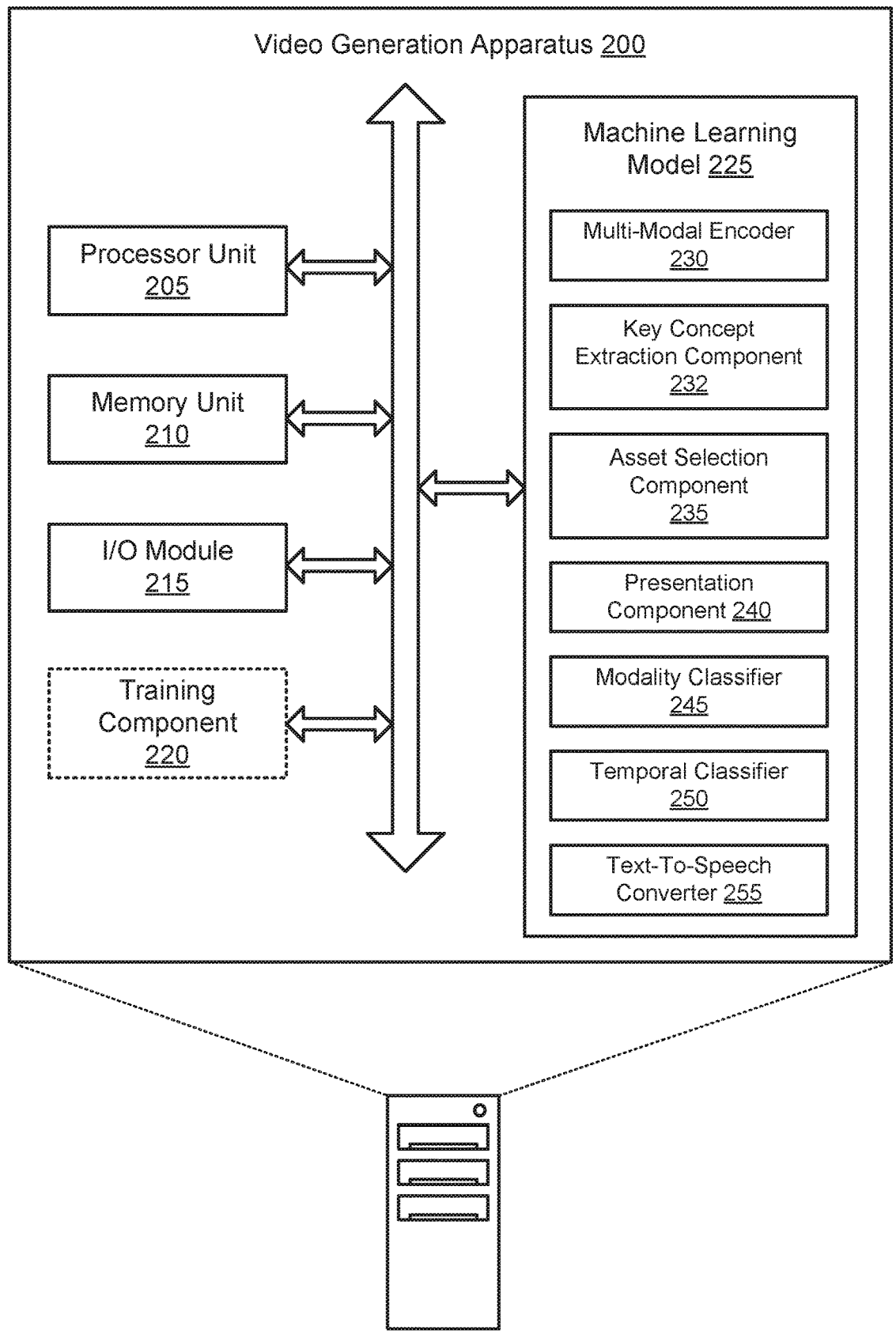
FIG. 2 shows an example of a video generation apparatus according to aspects of the present disclosure.
Figure 3:
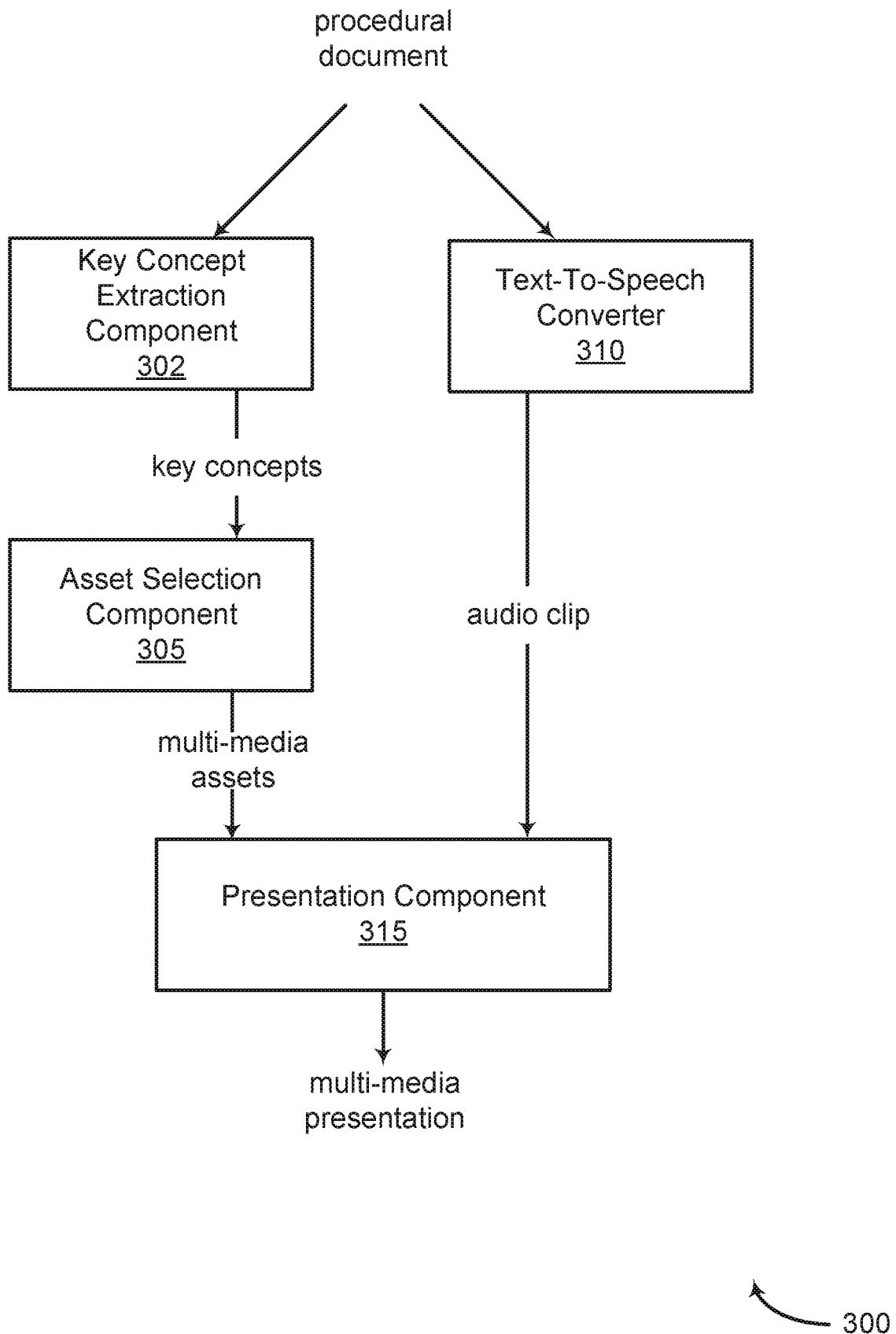
FIG. 3 shows an example of a video generation diagram according to aspects of the present disclosure.

In FIGS. 1-3, an apparatus and method for video generation are described. One or more embodiments of the apparatus and method include a multi-modal encoder configured to encode multi-media assets and instructions from a set of procedural documents; a key concept extraction component configured to extract key concepts from the instructions; an asset selection component configured to compute an information coverage distribution that indicates whether a corresponding multi-media asset of the multi-media assets relates to each of the key concepts in a corresponding instruction and to select a set of multi-media assets for each of the instructions to obtain a plurality of sets of multi-media assets; and a presentation component configured to generate a multi-media presentation by combining the plurality of sets of multi-media assets based on a presentation template.

Some examples of the apparatus and method further include a modality classifier configured to compute a plurality of modality values for the corresponding instruction, wherein the asset selection component is configured to compute a modality score for the corresponding multi-media asset based on the plurality of modality values.

Some examples of the apparatus and method further include a temporal classifier configured to classify the corresponding instruction and the corresponding multi-media asset based on a plurality of temporal relationships to obtain a plurality of temporal relationship scores, wherein the asset selection component is configured to combine the plurality of temporal relationship scores to obtain a temporal coverage score.

FIG. 1 shows an example of a video generation system according to aspects of the present disclosure. The example shown includes user 100, user device 105, video generation apparatus 110, cloud 115, and database 120. Video generation apparatus 110 is an example of, or includes aspects of, the corresponding element described with reference to FIG. 2.

In an example of FIG. 1, user 100 provides instructions to video generation apparatus 110. In some embodiments, user 100 may upload a procedural document to video generation apparatus 110, e.g., via user device 105 and cloud 115. In some examples, a procedural document is a manual, a recipe, or any text involving a sequence of steps. A procedural document can be stored in file formats such as .doc, .docx, .pdf, .html, etc. In some examples, a text recognition application extracts procedure from image files (e.g., .jpg, .jpeg, etc.). The procedural document, is this example, is a chocolate cake recipe. One instruction from the chocolate cake recipe is "in a large bowl, whisk together the sugar, flour, cocoa powder, baking powder, baking soda, and salt". User 100 looks for a tutorial representation based on the procedural document, so user 100 gains a better understanding of the instruction.

Video generation apparatus 110 retrieves candidate multi-media assets from database 120 via cloud 115. In some examples, candidate multi-media assets include images, short video clips, text descriptions about making chocolate cakes. Video generation apparatus 110 selects a combination of multi-media assets for instructions of the procedural document, for example, "in a large bowl, whisk together the sugar, flour, cocoa powder, baking powder, baking soda, and salt"). Video generation apparatus 110 selects one or more assets based on an information coverage distribution such that the one or more assets relate to key concepts and has an optimal information coverage of the key concepts in the instruction (e.g., "sugar", "flour", "cocoa powder", "baking powder").

Video generation apparatus 110 selects one or more assets based on an information coverage distribution for each instruction and generates a multi-media presentation (e.g., a synthesized video) by combining the assets corresponding to each instruction. The synthesized video is then transmitted to user 100 via cloud 115 and user device 105. In some cases, video generation apparatus 110 may be implemented on user device 105.

User device 105 may be a personal computer, laptop computer, mainframe computer, palmtop computer, personal assistant, mobile device, or any other suitable processing apparatus. In some examples, user device 105 includes software that incorporates a video processing application (e.g., a video editing application). In some examples, the video editing application on user device 105 may include functions of video generation apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an 10 controller module). In some cases, a user interface may be a graphical user interface (GUI).

Video generation apparatus 110 receives a procedural document comprising a set of instructions. Video generation apparatus 110 selects a set of multi-media assets for each corresponding instruction of the set of instructions to obtain a plurality of sets of multi-media assets. Each multi-media asset of the set of multi-media assets is selected based on an information coverage distribution that indicates whether the multi-media asset relates to each of a set of key concepts in the corresponding instruction. Video generation apparatus 110 generates a multi-media presentation describing the procedural document by combining the plurality of sets of multi-media assets based on a presentation template. Video generation apparatus 110 returns the multi-media presentation to user 100. The process of using video generation apparatus 110 is further described with reference to FIG. 4.

Video generation apparatus 110 includes a computer implemented network comprising a multi-modal encoder, an asset selection component, and a presentation component. In some examples, video generation apparatus 110 further includes a modality classifier and a temporal classifier.

Video generation apparatus 110 may also include a processor unit, a memory unit, an I/O module, and a training component. The training component is used to train a machine learning model (or a video generation network). Additionally, video generation apparatus 110 can communicate with database 120 via cloud 115. In some cases, the architecture of the machine learning model is also referred to as a network or a network model. Further detail regarding the architecture of video generation apparatus 110 is provided with reference to FIGS. 2-3. Further detail regarding the operation of video generation apparatus 110 is provided with reference to FIGS. 4-14.

In some cases, video generation apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general-purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

FIG. 2 shows an example of a video generation apparatus 200 according to aspects of the present disclosure. The example shown includes video generation apparatus 200, processor unit 205, memory unit 210, I/O module 215, training component 220, and machine learning model 225. Machine learning model 225 includes multi-modal encoder 230, asset selection component 235, presentation component 240, modality classifier 245, temporal classifier 250, and text-to-speech converter 255. According to some embodiments, machine learning model 225 receives a procedural document including a set of instructions. Machine learning model 225 is an example of, or includes aspects of, the corresponding element described with reference to FIG. 3. Video generation apparatus 200 is an example of, or includes aspects of, the corresponding element described with reference to FIG. 1.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into processor unit 205. In some cases, processor unit 205 is configured to execute computer-readable instructions stored in a memory to perform various functions. In some embodiments, processor unit 205 includes special purpose components for modem processing, baseband processing, digital signal processing, or transmission processing.

Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state.

I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

In some examples, I/O module 215 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, video generation apparatus 200 includes a computer implemented artificial neural network (ANN) for selecting a set of multi-media assets for instructions of a procedural document and generating a multi-media presentation (e.g., a video). An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. In some examples, nodes may determine their output using other mathematical algorithms (e.g., selecting the max from the inputs as the output) or any other suitable algorithm for activating the node. Each node and edge is associated with one or more node weights that determine how the signal is processed and transmitted.

During a training process, these weights are adjusted to increase the accuracy of the result (e.g., attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

According to some embodiments, video generation apparatus 200 includes a convolutional neural network (CNN) for video processing. CNN is a class of neural networks that is commonly used in computer vision or image classification systems. In some cases, a CNN may enable processing of digital images with minimal pre-processing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 220 receives a training set including a procedural document, where the procedural document includes a set of instructions. In some examples, training component 220 applies a set of heuristic labeling functions to the training set to obtain heuristic label data. Training component 220 compares the predicted label data to the heuristic label data. Training component 220 updates parameters of the modality classifier 245 based on the comparison of the predicted label data and the heuristic label data. In some embodiments, the set of heuristic labeling functions includes an action type labeling function, an action count labeling function, a text length labeling function, a numerical quantity labeling function, or any combination thereof.

In some examples, training component 220 receives a temporal training set including ground-truth labels for a set of temporal relationships between actions and multi-media assets. Training component 220 compares the predicted temporal labels to the ground-truth labels. In some examples, training component 220 updates parameters of the temporal classifier 250 based on the comparison of the predicted temporal labels and the ground-truth labels. In some embodiments, training component 220 from a different apparatus other than video generation apparatus 200 can be used to train machine learning model 225.

According to some embodiments, multi-modal encoder 230 encodes procedural text from the procedural document to obtain encoded procedural text. In some examples, multi-modal encoder 230 encodes a description text for each multi-media asset in the collection of multi-media assets to obtain encoded description text.

In some examples, multi-modal encoder 230 encodes each multi-media asset in the collection of multi-media assets to obtain an encoded multi-media asset. In some examples, multi-modal encoder 230 encodes each key concept of the set of key concepts to obtain a set of encoded key concepts. Multi-modal encoder 230 encodes the multi-media asset to obtain an encoded multi-media asset. According to some embodiments, multi-modal encoder 230 is configured to encode multi-media assets and procedural documents comprising a set of instructions.

According to some embodiments, key concept extraction component 232 is configured to extract a set of key concepts for an instruction of the set of instructions. In some examples, key concept extraction component 232 identifies a set of text delimiters. Key concept extraction component 232 applies a keyword extraction algorithm to the instruction based on the set of text delimiters to obtain the set of key concepts. Key concept extraction component 232 is an example of, or includes aspects of, the corresponding element described with reference to FIG. 3.

In some examples, keyword extraction (also known as keyword detection or keyword analysis) is a text analysis method that automatically extracts the most used and most important words and expressions from a text. A keyword extraction algorithm helps summarize the content of texts and recognize the main topics discussed. One example of the keyword extraction algorithm is rapid automatic keyword extraction (RAKE). RAKE uses a list of stopwords and phrase delimiters to detect the most relevant words or phrases in a piece of text. First, RAKE splits the text into a list of words and removes stopwords from that list. This returns a list of what is known as content words. Then, the algorithm splits the text at phrase delimiters and stopwords to create candidate expressions. Once the text has been split, RAKE creates a matrix of word co-occurrences. Each row shows the number of times that a given content word co-occurs with every other content word in the candidate phrases.

According to some embodiments, asset selection component 235 selects a set of multi-media assets for each corresponding instruction of the set of instructions to obtain a set of sets of multi-media assets, where each multi-media asset of the set of multi-media assets is selected based on an information coverage distribution that indicates whether the multi-media asset relates to each of a set of key concepts in the corresponding instruction. In some examples, asset selection component 235 retrieves a set of candidate multi-media assets from a database containing a collection of multi-media assets, where the set of multi-media assets is selected from the set of candidate multi-media assets.

According to an embodiment, asset selection component 235 computes an information coverage distribution for each of a set of candidate multi-media assets, wherein the information coverage distribution indicates whether a corresponding multi-media asset relates to each of the set of key concepts. Asset selection component 235 then selects a set of multi-media assets for the instruction based on the information coverage distribution.

In some examples, asset selection component 235 generates an indexing vector for a description text of each corresponding multi-media asset in the collection of multi-media assets to obtain an indexed description text, where the indexing vector indicates a presence of each word from a collection of words corresponding to the collection of multi-media assets. Asset selection component 235 indexes the description text based on the indexing vector. Asset selection component 235 weights each multi-media asset in the collection of multi-media assets, where the set of candidate multi-media assets is selected based on the weighted multi-media asset.

In some examples, asset selection component 235 compares the encoded procedural text to the encoded description text, where the set of candidate multi-media assets is selected based on the comparison. In some examples, asset selection component 235 compares the encoded procedural text to the encoded multi-media asset, where the set of candidate multi-media assets is selected based on the comparison.

In some examples, asset selection component 235 extracts the set of key concepts from the corresponding instruction. Asset selection component 235 computes a similarity value between the encoded multi-media asset and each of the set of encoded key concepts to obtain a set of concept relevance scores for the multi-media asset, where the information coverage distribution is based on the set of concept relevance scores. In some examples, asset selection component 235 computes an aggregate relevance score for the multi-media asset based on the set of concept relevance scores, where the set of multi-media assets is selected based on the aggregate relevance score. In some examples, asset selection component 235 computes an information coverage score based on a divergence of the set of concept relevance scores, where the set of multi-media assets is selected based on the information coverage score.

In some examples, asset selection component 235 computes a semantic similarity score between the corresponding instruction and a subsequent instruction, where the set of multi-media assets is selected based on the semantic similarity score. In some examples, asset selection component 235 identifies a complexity indicator for the multi-media presentation, where the set of multi-media assets is selected based on the complexity indicator. Asset selection component 235 is an example of, or includes aspects of, the corresponding element described with reference to FIG. 3.

According to some embodiments, presentation component 240 generates a multi-media presentation describing the procedural document by combining the set of sets of multi-media assets based on a presentation template. In some examples, presentation component 240 identifies a set of presentation templates. Presentation component 240 selects the presentation template from the set of presentation templates based on the set of multi-media assets. Presentation component 240 arranges the set of multi-media assets to obtain an instruction frame, where the multi-media presentation includes the instruction frame. Presentation component 240 is an example of, or includes aspects of, the corresponding element described with reference to FIG. 3.

According to some embodiments, modality classifier 245 identifies a modality of the multi-media asset. In some examples, modality classifier 245 computes a modality score based on the corresponding instruction and the modality of the multi-media asset, where the set of multi-media assets is selected based on the modality score. Modality classifier 245 classifies each of the set of instructions to obtain predicted label data.

According to some embodiments, modality classifier 245 is configured to compute a plurality of modality values for the corresponding instruction, wherein the asset selection component 235 is configured to compute a modality score for the multi-media asset based on the plurality of modality values.

According to some embodiments, temporal classifier 250 classifies the corresponding instruction and the multi-media asset based on a set of temporal relationships to obtain a set of temporal relationship scores. The asset selection component 235 is configured to combine the set of temporal relationship scores to obtain a temporal coverage score. In some examples, temporal classifier 250 combines the set of temporal relationship scores to obtain a temporal coverage score, where the set of multi-media assets is selected based on the temporal coverage score. In some examples, temporal classifier 250 predicts temporal labels for the set of instructions and a set of multi-media assets.

According to some embodiments, text-to-speech converter 255 converts the corresponding instruction to an audio clip, where the multi-media presentation includes the audio clip. Text-to-speech converter 255 is an example of, or includes aspects of, the corresponding element described with reference to FIG. 3.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 3 shows an example of a video generation diagram according to aspects of the present disclosure. Machine learning model 300 is an example of, or includes aspects of, the corresponding element described with reference to FIG. 2. The example shown includes machine learning model 300, key concept extraction component 302, asset selection component 305, text-to-speech converter 310, and presentation component 315. From top to bottom, a procedural document is input to key concept extraction component 302. Key concept extraction component 302 extracts a set of key concepts for an instruction in the procedural document. In some examples, key concept extraction component 302 identifies a set of text delimiters. Key concept extraction component 302 applies a keyword extraction algorithm to the instruction based on the set of text delimiters to obtain the set of key concepts. Key concept extraction component 302 is an example of, or includes aspects of, the corresponding element described with reference to FIG. 2.

According to an embodiment, the set of key concepts for the instruction is input to asset selection component 305. Asset selection component 305 retrieves a set of candidate multi-media assets from a database and selects a set of multi-media assets for video generation from the set of candidate multi-media assets. Asset selection component 305 computes an information coverage distribution for each of the set of candidate multi-media assets, where the information coverage distribution indicates whether a corresponding multi-media asset relates to each of the set of key concepts. Asset selection component 305 selects a set of multi-media assets for the instruction based on the information coverage distribution. Asset selection component 305 is an example of, or includes aspects of, the corresponding element described with reference to FIG. 2.

The procedural document is also input to text-to-speech converter 310 (e.g., text-to-speech software application). In some examples, text-to-speech converter 310 generates voiceover (i.e., an audio clip) from the input instructions in the procedural document. The voiceover is first generated for each instruction and later overlaid with the corresponding frames. Text-to-speech converter 310 is an example of, or includes aspects of, the corresponding element described with reference to FIG. 2.

The selected set of multi-media assets and the audio clip are input to presentation component 315. Presentation component 315 is configured to merge all the short clips generated into a final video for the procedural document. In some cases, the final video is also referred to as a multi-media presentation. Presentation component 315 is an example of, or includes aspects of, the corresponding element described with reference to FIG. 2.

Video Generation

In FIGS. 4-14, a method, apparatus, and non-transitory computer readable medium for video generation are described. One or more embodiments of the method, apparatus, and non-transitory computer readable medium include receiving a procedural document comprising a plurality of instructions; extracting a plurality of key concepts for an instruction of the plurality of instructions; computing an information coverage distribution for each of a plurality of candidate multi-media assets, wherein the information coverage distribution indicates whether a corresponding multi-media asset relates to each of the plurality of key concepts; selecting a set of multi-media assets for the instruction based on the information coverage distribution; and generating a multi-media presentation describing the procedural document by combining the set of multi-media assets based on a presentation template.

Some examples of the method, apparatus, and non-transitory computer readable medium further include retrieving the plurality of candidate multi-media assets from a database containing a collection of multi-media assets, wherein the set of multi-media assets is selected from the set of candidate multi-media assets.

Some examples of the method, apparatus, and non-transitory computer readable medium further include generating an indexing vector for a description text of each corresponding multi-media asset in the collection of multi-media assets to obtain an indexed description text, wherein the indexing vector indicates a presence of each word from a collection of words corresponding to the collection of multi-media assets. Some examples further include indexing the description text based on the indexing vector. Some examples further include weighting each multi-media asset in the collection of multi-media assets, wherein the plurality of candidate multi-media assets is selected based on the weighted multi-media asset.

Some examples of the method, apparatus, and non-transitory computer readable medium further include encoding procedural text from the procedural document to obtain encoded procedural text. Some examples further include encoding a description text for each multi-media asset in the collection of multi-media assets to obtain encoded description text. Some examples further include comparing the encoded procedural text to the encoded description text, wherein the plurality of candidate multi-media assets is selected based on the comparison.

Some examples of the method, apparatus, and non-transitory computer readable medium further include encoding procedural text from the procedural document to obtain encoded procedural text. Some examples further include encoding each multi-media asset in the collection of multi-media assets to obtain an encoded multi-media asset. Some examples further include comparing the encoded procedural text to the encoded multi-media asset, wherein the plurality of candidate multi-media assets is selected based on the comparison.

Some examples of the method, apparatus, and non-transitory computer readable medium further include identifying a set of text delimiters; and applying a keyword extraction algorithm to the instruction based on the set of text delimiters to obtain the plurality of key concepts. Some examples further include encoding each key concept of the plurality of key concepts to obtain a plurality of encoded key concepts. Some examples further include encoding a multi-media asset to obtain an encoded multi-media asset. Some examples further include computing a similarity value between the encoded multi-media asset and each of the plurality of encoded key concepts to obtain a plurality of concept relevance scores for the multi-media asset, wherein the information coverage distribution is based on the plurality of concept relevance scores.

Some examples of the method, apparatus, and non-transitory computer readable medium further include computing an aggregate relevance score for the multi-media asset based on the plurality of concept relevance scores, wherein the set of multi-media assets is selected based on the aggregate relevance score.

Some examples of the method, apparatus, and non-transitory computer readable medium further include computing an information coverage score based on a divergence of the plurality of concept relevance scores, wherein the set of multi-media assets is selected based on the information coverage score.

Some examples of the method, apparatus, and non-transitory computer readable medium further include classifying the instruction and the corresponding multi-media asset based on a plurality of temporal relationships to obtain a plurality of temporal relationship scores. Some examples further include combining the plurality of temporal relationship scores to obtain a temporal coverage score, wherein the set of multi-media assets is selected based on the temporal coverage score.

Some examples of the method, apparatus, and non-transitory computer readable medium further include identifying a modality of the corresponding multi-media asset. Some examples further include computing a modality score based on the instruction and the modality of the corresponding multi-media asset, wherein the set of multi-media assets is selected based on the modality score.

Some examples of the method, apparatus, and non-transitory computer readable medium further include computing a semantic similarity score between the instruction and a subsequent instruction, wherein the set of multi-media assets is selected based on the semantic similarity score.

Some examples of the method, apparatus, and non-transitory computer readable medium further include converting the instruction to an audio clip, wherein the multi-media presentation includes the audio clip.

Some examples of the method, apparatus, and non-transitory computer readable medium further include identifying a plurality of presentation templates. Some examples further include selecting the presentation template from the plurality of presentation templates based on the set of multi-media assets. Some examples further include arranging the set of multi-media assets to obtain an instruction frame, wherein the multi-media presentation includes the instruction frame.

Some examples of the method, apparatus, and non-transitory computer readable medium further include identifying a complexity indicator for the corresponding multi-media presentation, wherein the set of multi-media assets is selected based on the complexity indicator.

Figure 4:
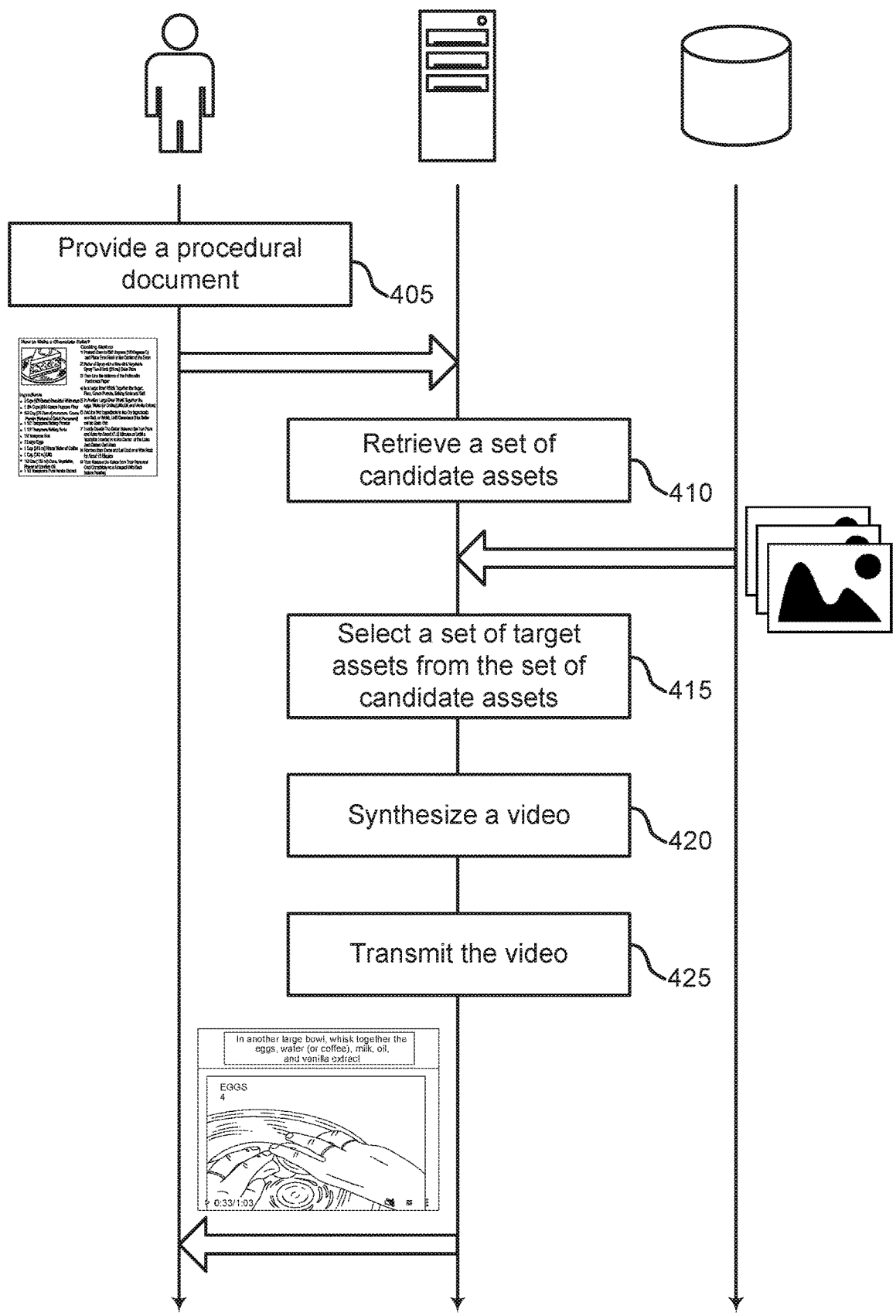
FIG. 4 shows an example of a video generation application according to aspects of the present disclosure.

FIG. 4 shows an example of video generation application according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the user provides a procedural document. In some cases, the operations of this step refer to, or may be performed by, a user as described with reference to FIG. 1. In some cases, the operations of this step refer to, or may be performed by, a user via user device as described with reference to FIG. 1.

Documents such as technical reports, manuals, instructional documents, etc. are rich sources of information for users. However, such documents include a large amount of text and users may have difficulty processing the information. In some examples, procedural documents have textual descriptions depicting complex steps and they involve a sequence of instructions. In some examples, a procedural document is a manual, a recipe, or any text involving a sequence of steps. A procedural document can be stored in file formats such as .doc, docx, .pdf, .html, etc. In some examples, a text recognition software application extracts procedure from image files (e.g., .jpg, jpeg, etc.). Embodiments of the present disclosure are not limited to the file formats or image files mentioned herein. For example, a procedural document may be an Ikea® assembly manual that provides a step-by-step guide related to furniture assembly. In another example, a procedural document may outline a sequence of instructions for a cooking recipe. In some cases, textual descriptions of procedure may not be accompanied by appropriate illustrations. For example, a user cannot identify some of the complex ingredients in a recipe or visualize intricate processes involved in making the dish.

At operation 410, the system retrieves a set of candidate assets from a database. In some cases, the operations of this step refer to, or may be performed by, a video generation apparatus as described with reference to FIGS. 1 and 2. The video generation apparatus retrieves a set of candidate assets from database 120 as shown in FIG. 1. As an example shown in FIG. 4, the procedural document from the user is a recipe about chocolate cakes. For example, an instruction from the recipe states "in a large bowl, whisk together the sugar, flour, cocoa powder, baking powder, baking soda, and salt"). The retrieved set of candidate assets relate to making chocolate cakes and are of different modalities (e.g., image, text, audio, video). However, the retrieved set of candidate assets are not ranked yet. Certain assets in the set of candidate assets are not appropriate assets to illustrate the above instruction in a clear and accurate manner.

At operation 415, the system selects a set of target assets from the set of candidate assets. In some cases, the operations of this step refer to, or may be performed by, a video generation apparatus as described with reference to FIGS. 1 and 2. In some cases, images, textual descriptions, video clips may be referred to as assets or multi-media assets. These assets are multi-modal assets as they are of different media formats (image, audio, video, text format, etc.). Video generation apparatus selects a combination of multi-media assets for instructions of the procedural document.

At operation 420, the system synthesizes a video. In some cases, the operations of this step refer to, or may be performed by, a video generation apparatus as described with reference to FIGS. 1 and 2. The video generation apparatus converts a procedural document to a multi-modal illustrative video. In some examples, the video generation apparatus synthesizes an explanatory video based on the procedural document from a user (e.g., recipe about making chocolate cakes). The synthesized video can be customized to the needs and expertise of users (i.e., a succinct version, an elaborate version). Accordingly, having the explanatory video guiding users through steps in the procedural document, user experience and user understanding of the procedural document is increased.

At operation 425, the system transmits the video. In some cases, the operations of this step refer to, or may be performed by, a video generation apparatus as described with reference to FIGS. 1 and 2. The system transmits the synthesized video to the user to consume. The user may provide the video generation apparatus with a different procedural document.

Figure 5:
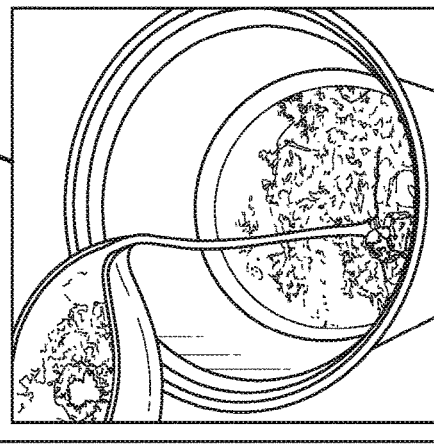
FIG. 5 shows an example of frames from a multi-media presentation according to aspects of the present disclosure.
Figure 5:
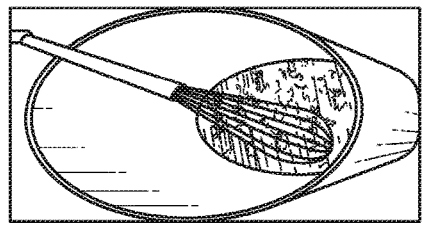
Figure 5:
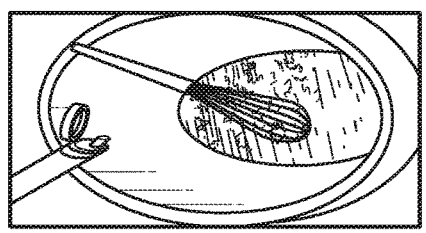
Figure 5:
Figure 5:
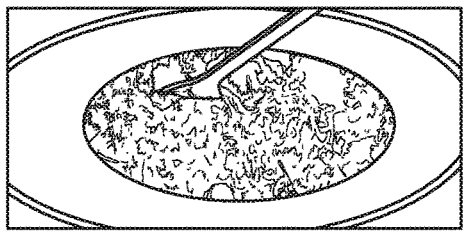
Figure 5:
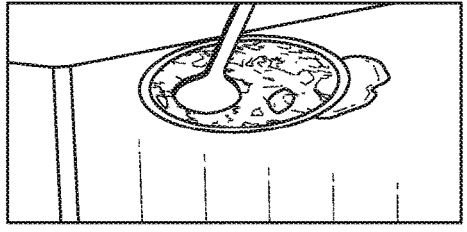

FIG. 5 shows an example of frames from a multi-media presentation 500 according to aspects of the present disclosure. Video generation apparatus 200 of FIG. 2 generates multi-media presentation 500 comprising a sequence of video frames 515 for users. The example shown includes multi-media presentation 500, image modality 505, text modality 510, and video frame 515.

As an example, FIG. 5 shows a set of four video frames (frames a to d) from a succinct video variant. The succinct video is synthesized by video generation apparatus 200. The video clip asset in frame (a) shows "hot water" being added that results in "nice and foamy" yeast, as indicated by the corresponding instruction or caption. Text modality 510 includes the instruction text ("to start off let's proof the yeast. To do this heat up your water in the microwave to about 105 to 115 degrees. The asset in frame (a) covers the information in procedural text fully and provide temporal aspect. Multi-media presentation 500 includes appropriate multi-modal assets selected by video generation apparatus 200.

As illustrated in frame (b), video generation apparatus 200 retrieves two image-modality assets corresponding to "stir with whisk" instruction. The two image assets are displayed on the left of multi-media presentation 500 for video frame (b). Multi-media presentation 500 demonstrates the whisking action optimally due to a strong temporal aspect ranking. In frame (c), video generation apparatus 200 retrieves appropriate assets containing both "yeast" and "wooden spoon" for whisking. This shows the strong visual and textual relevance of the selected assets due to significant gains in the retrieval and ranking stages. The qualitative results also indicate that video generation apparatus 200 encodes action procedures behaviorally in visual assets that allows for self-correction at user end.

Some instructions contain less or no semantic information. They act as connectors between two steps and contain brief text such as "do as described" shown in frame (d). Frame (d) contains an image corresponding to a topping being added to the pizza dough, i.e., related assets to the context of the instruction. This shows the Viterbi decoding step of the present disclosure can pass information from one frame to another so that overall semantic coherence is achieved and improved. In some examples, video frames (a, b, c, d) shown in FIG. 5 can be found at timestamps (0:10, 0:15, 0:25, 1:05), respectively.

Figure 6:
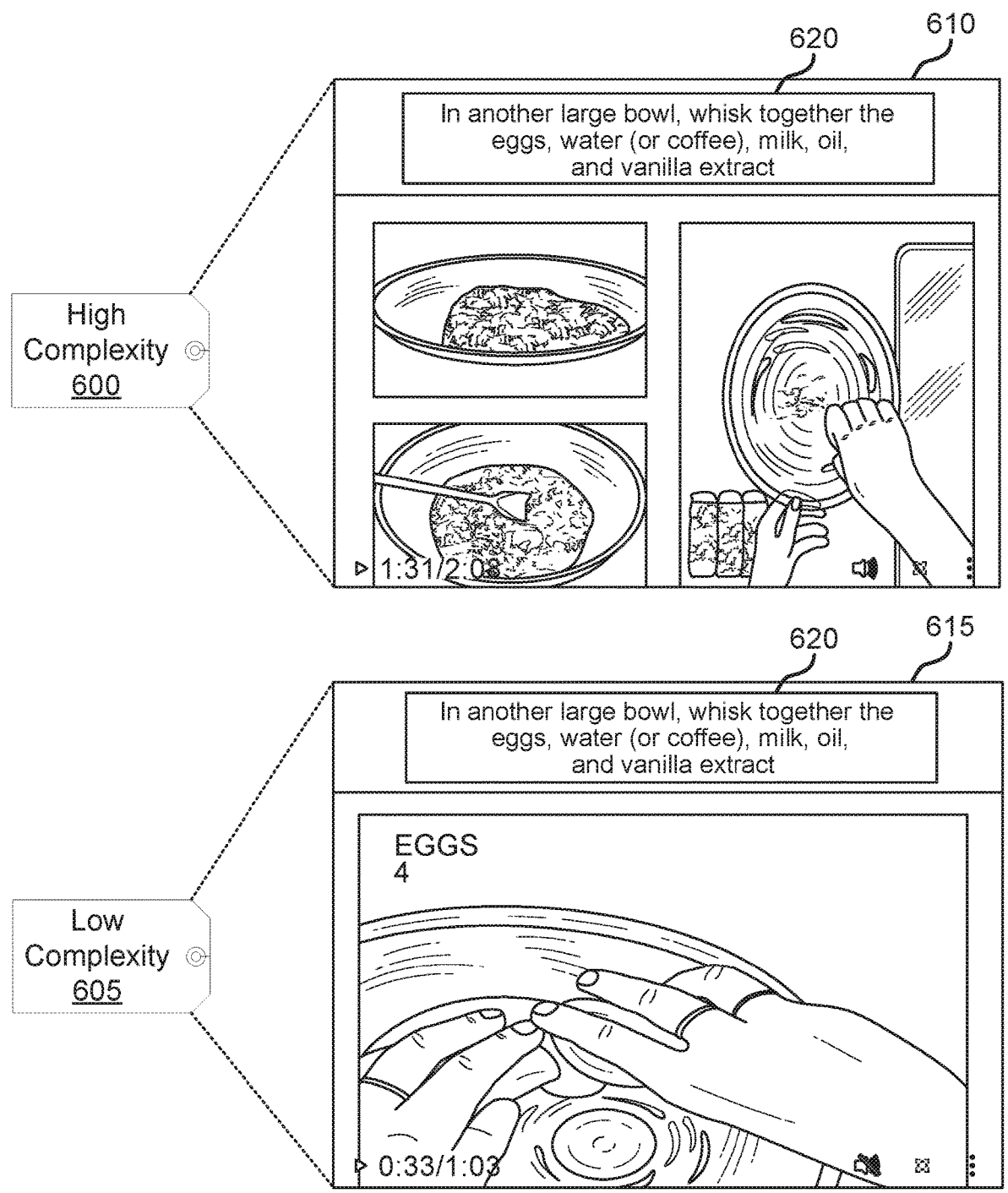
FIG. 6 shows an example of video frames based on a complexity indicator according to aspects of the present disclosure.

FIG. 6 shows an example of video frames based on a complexity indicator according to aspects of the present disclosure. The example shown includes high complexity 600, low complexity 605, elaborate presentation 610, succinct presentation 615, and instruction 620. Instruction 620 is an example of, or includes aspects of, the corresponding element described with reference to FIG. 11. As an example shown in FIG. 6, video generation apparatus 200 of FIG. 2 synthesizes an elaborate video variant (see top) or a succinct video variant (see bottom) dependent on a complexity indicator. In some examples, video generation apparatus 200 identifies a complexity indicator for the multi-media presentation, where the set of multi-media assets (e.g., images, caption, audio) are selected to form a combination of assets for each frame based on the complexity indicator. When a user chooses high complexity 600, video generation apparatus 200 generates elaborate presentation 610. When a user chooses low complexity 605, video generation apparatus 200 generates succinct presentation 615. FIG. 6 shows a video frame at a certain timestamp extracted from the elaborate video variant and the succinct video variant. Elaborate presentation 610 and succinct presentation 615 are synthesized corresponding to a same instruction 620 but each presentation variant includes a different combination of multi-media assets and indicates different complexity levels for illustrating instruction 620.

In some examples, elaborate presentation 610 (i.e., elaborate variant) caters to users who prefer a detailed depiction of contents of text document. Such users may be novices who are not aware of the prerequisites for procedures in the input, or careful users who do not want to miss out on any of the actions and use the video for self-correction. Elaborate presentation 610 contains a large number of visual assets with longer duration to account for depiction of prerequisites (such as ingredients for a recipe).

In some examples, succinct presentation 615 (i.e., succinct variant) caters to users who prefer a relatively sharp depiction of contents of text document. Such users may include professionals who are aware of the procedure in the input but want a quick reference to not miss out on details. Succinct presentation 615 contains relatively small number of multi-media assets that cover a large amount of information with a short duration compared to the elaborate variant. In some examples, succinct presentation 615 is a different video with non-overlapping assets compared to elaborate presentation 610. That is, succinct presentation 615 is not a sped-up version of elaborate presentation 610.

Figure 7:
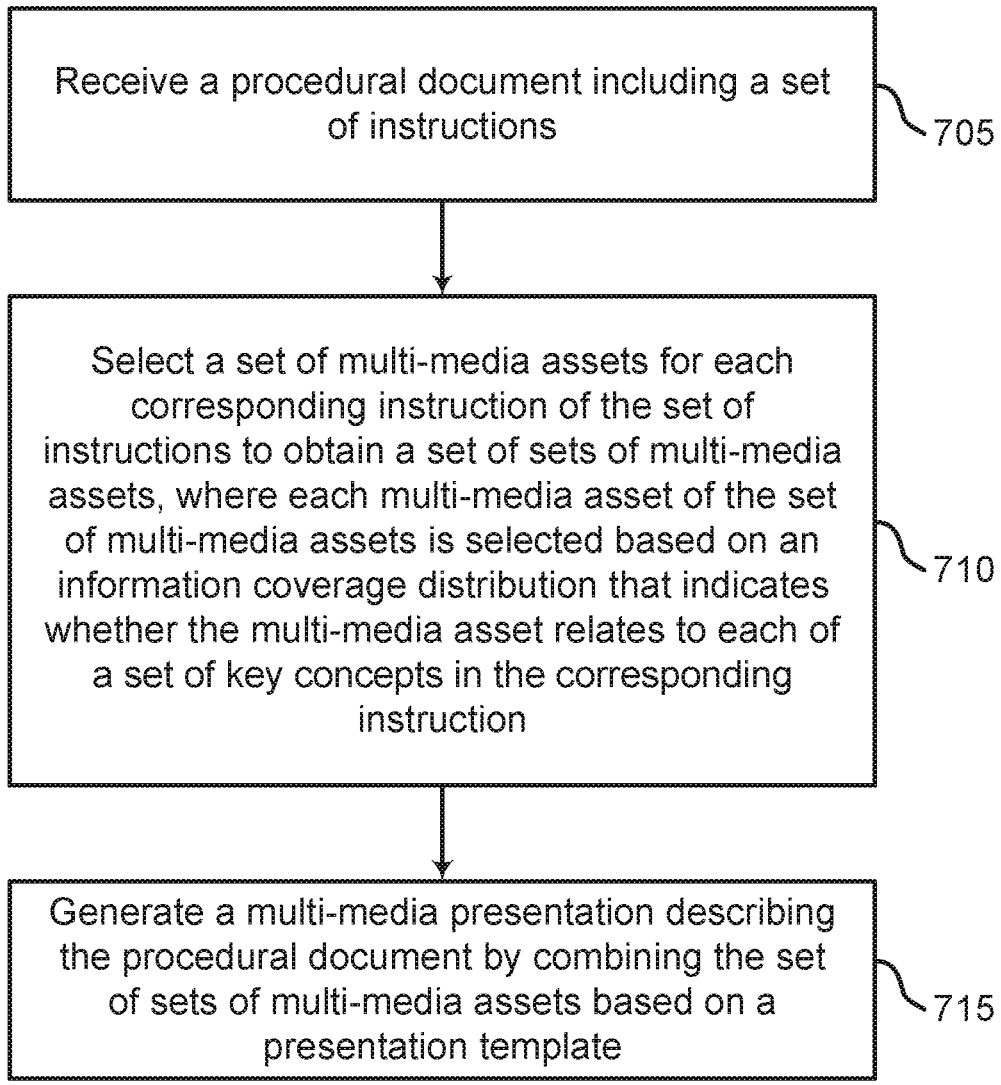
FIG. 7 shows an example of a method for video processing according to aspects of the present disclosure.

FIG. 7 shows an example of a method for video processing according to aspects of the present disclosure. In some examples, these operations are performed by a system including a processor executing a set of codes to control functional elements of an apparatus (i.e., video generation apparatus 200 as in FIG. 2). Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system receives a procedural document including a set of instructions. In some cases, the operations of this step refer to, or may be performed by, a machine learning model as described with reference to FIGS. 2 and 3. In some examples, the procedural document contains a set of instructions or steps for reaching a task-specific goal. The procedural document can include different types of documents having steps or instructions such as an assembly manual, a cooking recipe (e.g., homemade pizza dough), non-recipe document (e.g., WikiHow article, repairing a switch), etc.

At operation 710, the system selects a set of multi-media assets for each corresponding instruction of the set of instructions to obtain a set of sets of multi-media assets, where each multi-media asset of the set of multi-media assets is selected based on an information coverage distribution that indicates whether the multi-media asset relates to each of a set of key concepts in the corresponding instruction. In some cases, the operations of this step refer to, or may be performed by, an asset selection component as described with reference to FIGS. 2 and 3. Operations with regards to retrieving a set of candidate multi-media assets from a database where the set of multi-media assets is selected from the set of candidate multi-media assets is described in greater detail in FIG. 9. Operations with regards to computing an information coverage score is described in greater detail in FIG. 10. Operations with regards to computing a temporal coverage score is described in greater detail in FIG. 12.

According to some embodiments, key concept extraction component 232 of FIG. 2 extracts a set of key concepts for an instruction of the set of instructions. The asset selection component computes an information coverage distribution for each of a set of candidate multi-media assets, wherein the information coverage distribution indicates whether a corresponding multi-media asset relates to each of the set of key concepts. The asset selection component the selects a set of multi-media assets for the instruction based on the information coverage distribution.

According to some embodiments, the asset selection component of video generation apparatus 200 selects multimodal assets (e.g., text, images, videos) at a per-frame level to maximize information coverage, answer relevant temporal questions (before step, during step, after step), and choose a specific combination of modalities and assets based on user preferences (i.e., elaborate video or succinct video).

In some examples, the machine learning model measures information covered by a combination of multi-media assets, which may then be used to synthesize parts of the final video. The machine learning model also models the temporal aspects of the instructions. That is, temporal aspects are covered in the selection of multi-media assets for effective illustration of instructions tailored to user needs. Additionally, the machine learning model chooses appropriate modality combinations to represent or illustrate each instruction of the procedural document based on multiple different factors. The machine learning model is configured to choose a sequence of multi-modal content and simultaneously account for the overall relevance and coherence.

At operation 715, the system generates a multi-media presentation describing the procedural document by combining the set of sets of multi-media assets based on a presentation template. In some cases, the operations of this step refer to, or may be performed by, a presentation component as described with reference to FIGS. 2 and 3. In some embodiments, the machine learning model converts a procedural document into an illustrative video. The machine learning model obtains per-frame multi-modal asset combinations by processing the procedural document and understanding the semantics (i.e., the machine learning model is not dependent on any additional side information). In addition to strong per-frame scores, the machine learning model is configured to ensure overall semantic and visual coherence of video frames of a synthesized video using Viterbi-style method.

Figure 8:
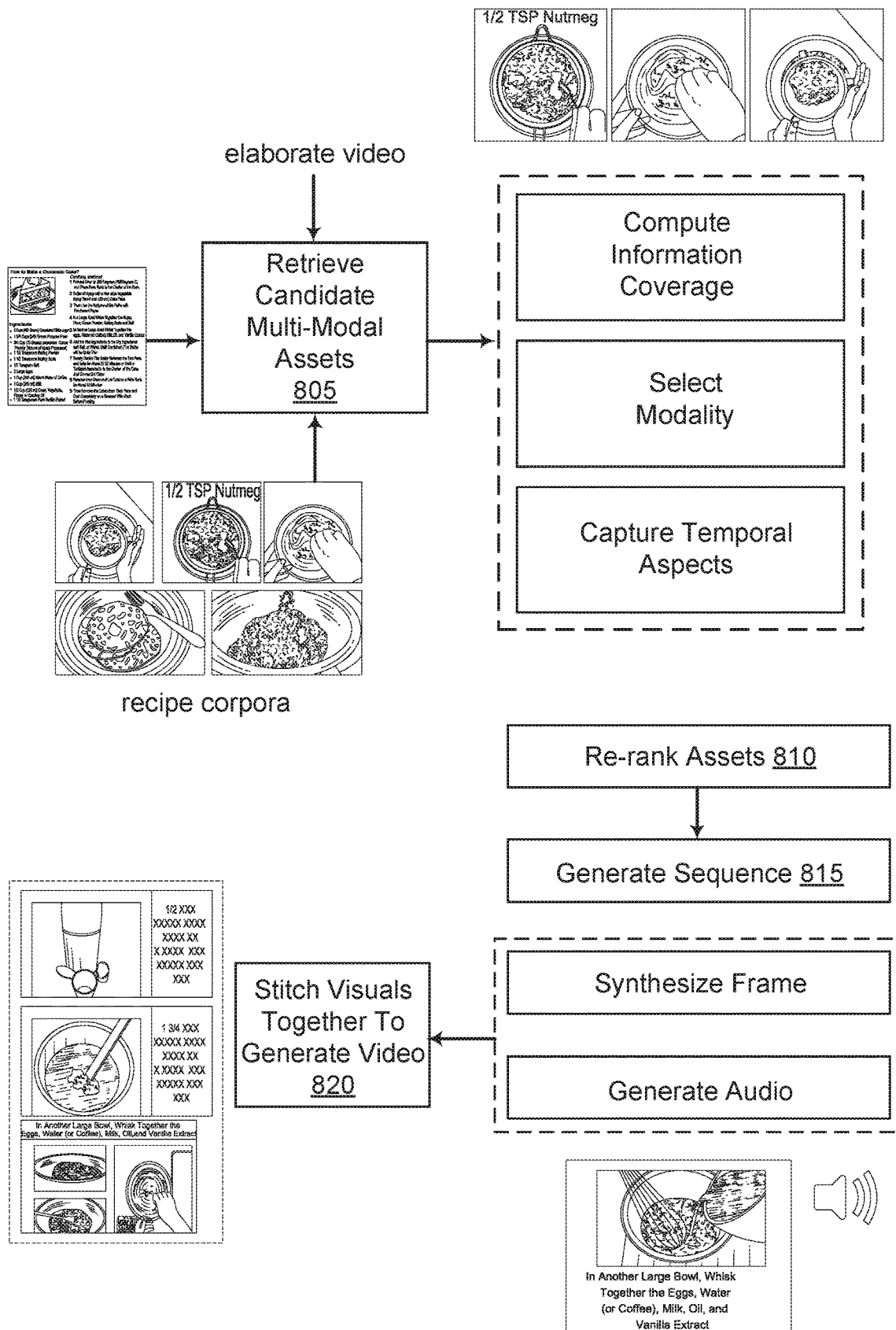
FIG. 8 shows an example of a method for synthesizing a video based on a procedural document according to aspects of the present disclosure.

FIG. 8 shows an example of a method for synthesizing a video based on a procedural document according to aspects of the present disclosure. FIG. 8 shows an example of using machine learning model 225 in FIG. 2 to synthesize a multi-media presentation (e.g., a video) based on a procedural document. In some cases, machine learning model 225 is configured to perform multiple tasks including asset collection, asset reranking, sequence generation, and video synthesis. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system retrieves candidate multi-modal assets. In some cases, the operations of this step refer to, or may be performed by, an asset selection component as described with reference to FIGS. 2 and 3. The video generation apparatus is configured to automatically generate a video from a procedural document. In some examples, procedural documents include recipe and non-recipe documents.

According to an embodiment, machine learning model 225 takes a textual document and user preferences (optional) as input. In some cases, different types of assets (e.g., videos and images) are retrieved for each instruction in the procedural document. Machine learning model 225 generates a combination of multi-media assets for instructions of a procedural document that best depicts component and actions in a corresponding instruction.

According to an embodiment, the asset selection component retrieves visuals (also referred to as assets or multimedia assets) such as images and short video clips from a large corpus that are illustrative of the components and instructions. For example, the corpus for recipes is built by combining images and videos from datasets such as RecipeQA, TastyVideos, and YouCook2. Alternatively, such a corpus comes from a structured scraping of content from the website. A brief description of the content (e.g., associated labels or metadata) is included for each image or video in the corpus. As for videos, machine learning model 225 extracts short clips from the recipe video to obtain unitary clips that illustrate a specific process that can be used independently of the full video. In some examples, the short clips are extracted using ground truth timestamp annotations available in the datasets. Additionally or alternatively, machine learning model 225 applies standard scene segmentations to get overlapping segments from a recipe video to obtain unitary clips.

According to an embodiment, machine learning model 225 extracts visual embeddings and text embeddings for videos. For example, frame-level and video-level features are extracted with pre-trained 2D and 3D CNNs. In some examples, 2D features are extracted with ImageNet pre-trained Resnet-152 at the rate of one frame per second and 3D features are extracted with the kinetics pretrained ResNeXt-101 16-frames model to obtain 1.5 features per second. The 2D and 3D features are aggregated by temporal max pooling before concatenating the 2D and 3D features into a single 4096-dimensional vector for each video clip. The textual annotations are pre-processed by removing common English stopwords. For example, the joint model can be pretrained on a large corpus of 136-million instructional video clips sourced from 1.22 M narrated instructional web videos depicting humans performing and describing over 23 k different visual tasks. The model is fine-tuned with the specific type of procedural document that is considered for enhanced capture of semantics between text and videos.

Machine learning model 225 aggregates the top assets retrieved by each of these methods for instructions of the procedural document.

At operation 810, the system re-ranks the retrieved multi-modal assets. In some cases, the operations of this step refer to, or may be performed by, an asset selection component as described with reference to FIGS. 2 and 3. The retrieved assets are noisy and may not sufficiently or accurately illustrate the instructions of a procedural document. Therefore, machine learning model 225 is configured to re-rank the assets (and any combinations) on various dimensions to arrive at an appropriate output to illustrate the instruction. The relevance and value of every asset towards illustrating the given instruction is considered to prune the set of assets in the instructions.

In some embodiments, the asset selection component calculates an information coverage score for each of the retrieved assets, measuring each asset's ability to cover information represented in the instruction. Additionally, the asset selection component analyzes the temporal aspects of the actions in the instruction. The ranking accounts for the temporal effect on the materials or components used, where the temporal stages are represented using a combination of visuals. Additionally, a modality choice is made because the collection of assets includes images and videos. The modality choice depends on the nature of the instruction to present a frame that does not increase the cognitive load of the user. The machine learning model takes user preferences into account during video synthesis. For example, the video generation apparatus outputs different video variants (e.g., elaborate version or succinct version).

At operation 815, the system generates a sequence. In some cases, the operations of this step refer to, or may be performed by, a presentation component as described with reference to FIGS. 2 and 3. Machine learning model 225 generates a coherent video based on the scored assets and combinations. Machine learning model 225 applies different methods to score multi-media assets and/or combination of assets on their ability to cover information and temporal aspects in the input instructions along with appropriateness of the modality for the instructions. Due to instructional steps, machine learning model 225 makes asset decisions in a way that the output synthesized video is visually and semantically coherent. In an embodiment, machine learning model 225 computes the cosine similarity between semantic embeddings of each combination of assets (from CLIP embeddings) and the machine learning model uses the cosine similarity between them as a measure of coherence of their transitions.

Additionally, the chosen combination of assets for each instruction optimizes the information coverage, temporal coverage, and modality appropriateness. Machine learning model 225 formulates a Viterbi-style dynamic programming task to solve. For example, the Viterbi problem is used in sequence prediction tasks to generate outputs that maximize local independent scores (i.e., coverage and modality appropriateness) and transition scores between consecutive elements (i.e., visual/semantic coherence). For the chosen assets in each step, a score is assigned for the sequence $\bar{y}$:

$$F(\bar{y}) = \sum_{y_i \in \bar{y}} S(y_i) + \sum_{y_i, y_{i+1}} T(y_i, y_{i+1}) \quad (1)$$

where $S(y_i)$ = weighted_sum($Rel(y_i)$, $IC(y_i)$, $TC(y_i)$, $Mod(y_i)$).

$Rel(y_i)$ = Relevance of $y_i$ for the $i^{th}$ instruction.

$IC(y_i)$ = information coverage score = $1-\sigma(kld(y_i))$, $\sigma$ = sigmoid, $kld(y_i) = KL$ divergence of information distribution of $y_i$ with uniform distribution.

$TC(y_i)$ = temporal coverage score of $y_i$.

$Mod(y_i)$ = likelihood of the modality of $y_i$.

$T(y_i, y_{i+1})$ = semantic similarity between $y_i$ and $y_{i+1}$.

Thus, maximizing $F(\bar{y})$ outputs sequences such that the inter-coherence of frames is high, making it smooth for users to follow a video. Additionally, users avoid unnecessary cognitive load because the generated video reduces context switching among frames.

At operation 820, the system stitches visuals together to generate a video. In some cases, the operations of this step refer to, or may be performed by, a presentation component as described with reference to FIGS. 2 and 3. According to an embodiment, machine learning model 225 chooses an optimal template from a set of pre-defined templates for a frame for the final video synthesis. In some cases, the optimal template is defined based on the number of assets, types of assets, and the text to be rendered on the frame. For example, each frame can have up to three assets, chosen based on the Viterbi optimization. In some examples, a text-to-speech software generates voiceover from the input instructions. The voiceover is first generated for each instruction and later overlaid with the corresponding frames. The presentation component is configured to merge all the short clips generated this way into the final video for the document.

Figure 9:
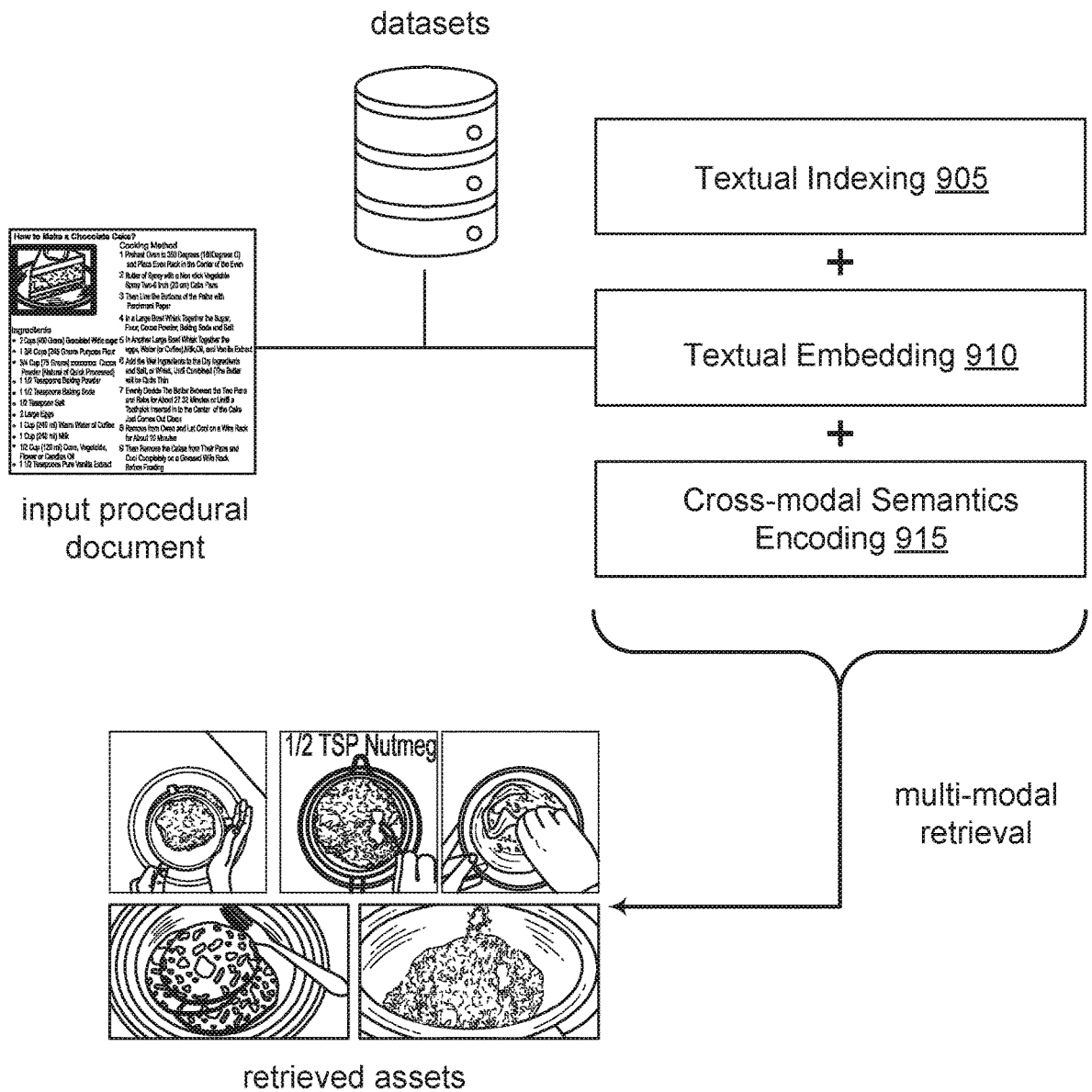
FIG. 9 shows an example of a method for asset retrieval according to aspects of the present disclosure.

FIG. 9 shows an example of a method for asset retrieval according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According to an embodiment, the asset selection component retrieves a set of relevant assets for instructions of a procedural document by combining retrievals obtained from different methods. For example, methods may include textual indexing-based, textual embeddings-based, and cross-modal semantics-based retrieval.

At operation 905, the system performs textual indexing. In some cases, the operations of this step refer to, or may be performed by, an asset selection component as described with reference to FIGS. 2 and 3. According to an embodiment, textual indexing-based retrieval uses descriptions associated with the videos and clips to index them using a weighting-based model. In some cases, hyper-geometric divergence from randomness weighting model is used to score the indexed assets for ranking and retrieval.

At operation 910, the system performs textual embedding. In some cases, the operations of this step refer to, or may be performed by, an asset selection component as described with reference to FIGS. 2 and 3. According to an embodiment, textual embeddings-based retrieval uses a similarity between the image/video descriptions and input textual components/instructions in a textual embedding space as a measure for ranking. In some examples, a pre-trained word2vec embedding model may be used for extracting the representations for the instructions and descriptions.

At operation 915, the system performs cross-modal semantics encoding. In some cases, the operations of this step refer to, or may be performed by, a multi-modal encoder as described with reference to FIG. 2. According to an embodiment, for cross-modal semantics-based retrieval, multi-modal encoder 230 of the machine learning model (see FIG. 2) applies multi-modal representations to convert images, videos, and text (i.e., instructions) into a common representation space. Additionally, for semantics-based retrieval, the asset selection component uses similarity in the common representation space to rank the assets.

In some cases, contrastive language image pre-training (CLIP) embeddings are used to deal with image semantics. In some examples, CLIP model (and its embeddings) may be pre-trained on 400 million image-text pairs. The asset selection component retrieves the images from corpus by taking images having maximum cosine similarity with instructions from a given procedural document.

Figure 10:
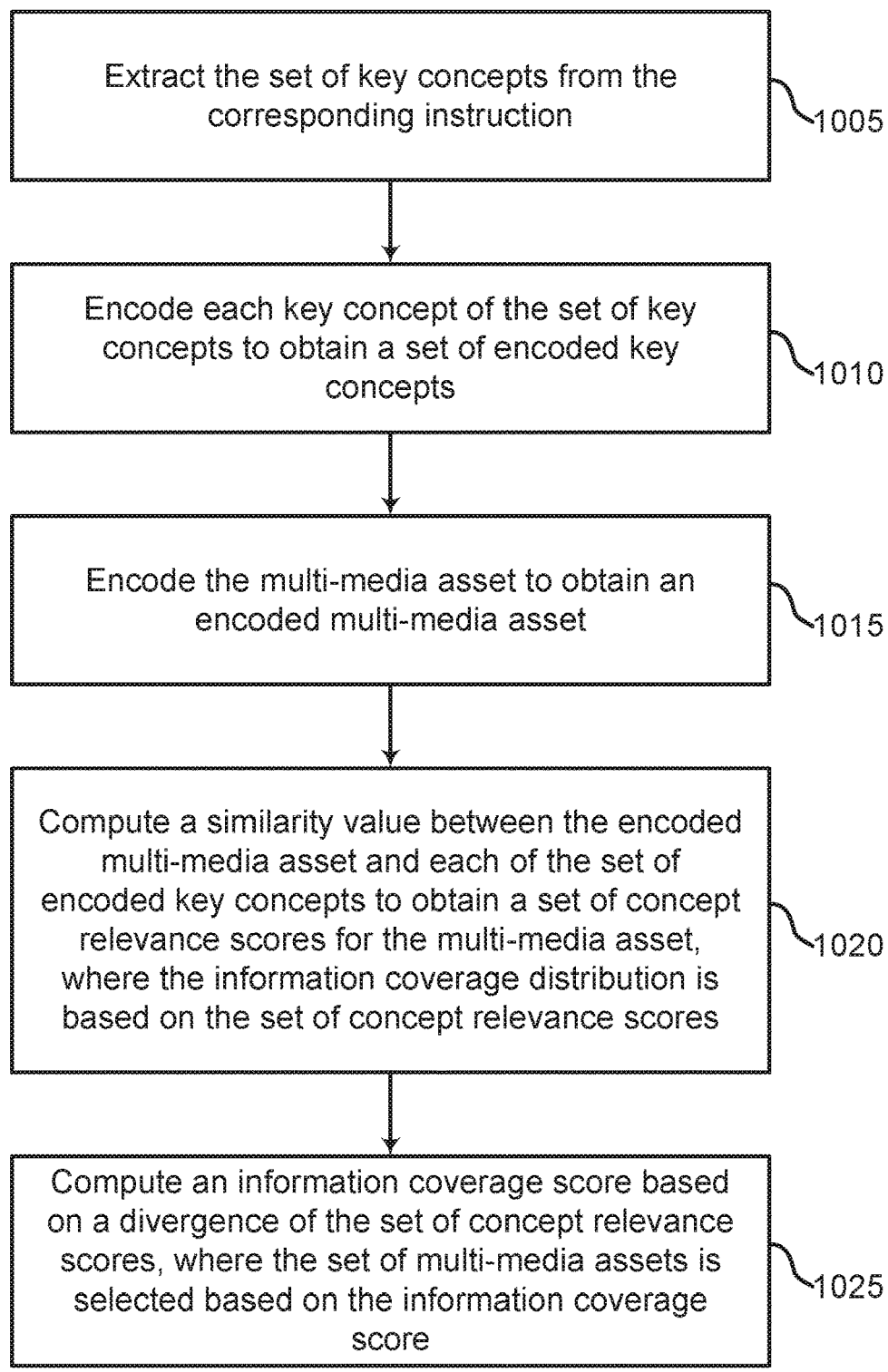
FIG. 10 shows an example of a method for asset selection based on information coverage distribution according to aspects of the present disclosure.

FIG. 10 shows an example of a method for asset selection based on information coverage distribution according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

According an embodiment, machine learning model 225 of FIG. 2 is configured to ensure that the visuals maximize information coverage on each instruction. Information coverage indicates that the visuals (i.e., images or videos) cover important concepts of the text. In some cases, a combination of image(s) and clip(s) are used to illustrate a text. Hence, a retrieved asset is evaluated for its ability to depict the instruction and arrive at a combination to best cover the instruction.

At operation 1005, the system extracts the set of key concepts from the corresponding instruction. In some cases, the operations of this step refer to, or may be performed by, an asset selection component as described with reference to FIGS. 2 and 3. The asset selection component extracts key phrases in an instruction which serves as a reference of different concepts to be covered by the asset combination.

At operation 1010, the system encodes each key concept of the set of key concepts to obtain a set of encoded key concepts. In some cases, the operations of this step refer to, or may be performed by, a multi-modal encoder as described with reference to FIG. 2.

At operation 1015, the system encodes the multi-media asset to obtain an encoded multi-media asset. In some cases, the operations of this step refer to, or may be performed by, a multi-modal encoder as described with reference to FIG. 2.

At operation 1020, the system computes a similarity value between the encoded multi-media asset and each of the set of encoded key concepts to obtain a set of concept relevance scores for the multi-media asset, where the information coverage distribution is based on the set of concept relevance scores. In some cases, the operations of this step refer to, or may be performed by, an asset selection component as described with reference to FIGS. 2 and 3.

Next, the asset selection component computes the affinity of each of the concepts to the retrieved images using a zero-shot classifier network extended from the CLIP model. In some examples, the zero-shot classifier network classifies if the input is relevant to a target concept. A list of key frames is passed and a relevance score is computed on each key frame in a video and the asset selection component aggregates the relevance scores for the video. Thus, the asset selection component obtains a set of scores indicating the relevance of an asset to different concepts in the instruction. The asset selection component then normalizes the scores into a probability distribution. Mathematically, let $t_1, t_2, \ldots, t_K$ be the key phrases extracted from instructions. For each image I (or aggregation of frames), the distribution over concepts $P_c$, is computed as follows:

$$P_c(I, k) = \frac{\exp(e^{IT} e_k^t)}{\sum_{i=1}^{K} \exp(e^{IT} e_i^t)} \quad (2)$$

where $e_1^t, e_2^t, \ldots, e_k^t = \text{CLIP} - \text{TEXT}(t_1, t_2, \ldots, t_K),$ $e^I = \text{CLIP} - \text{IMAGE}(I)$ At operation 1025, the system computes an information coverage score based on a divergence of the set of concept relevance scores, where the set of multi-media assets is selected based on the information coverage score. In some cases, the operations of this step refer to, or may be performed by, an asset selection component as described with reference to FIGS. 2 and 3.

The asset selection component computes the KL-divergence between the coverage distribution and a uniform distribution to get the information coverage for the asset combination. In some cases, an ideal asset is assumed to uniformly cover all aspects of the instruction. Mathematically, let $P_U \sim \text{Unif}(K)$ be the ideal distribution over K concepts, then the asset with the maximum rank corresponds to $I_a$ such that, $$a = \operatorname{argmin}_{a \in A} KL(P_c(I_a) \| P_U) = \operatorname{argmax}_{a \in A} \sum_{k=1}^{K} P_c(I_a, k) \frac{\log P_c(I_a, k)}{\log(P_U(k))} \quad (3)$$

Figure 11:
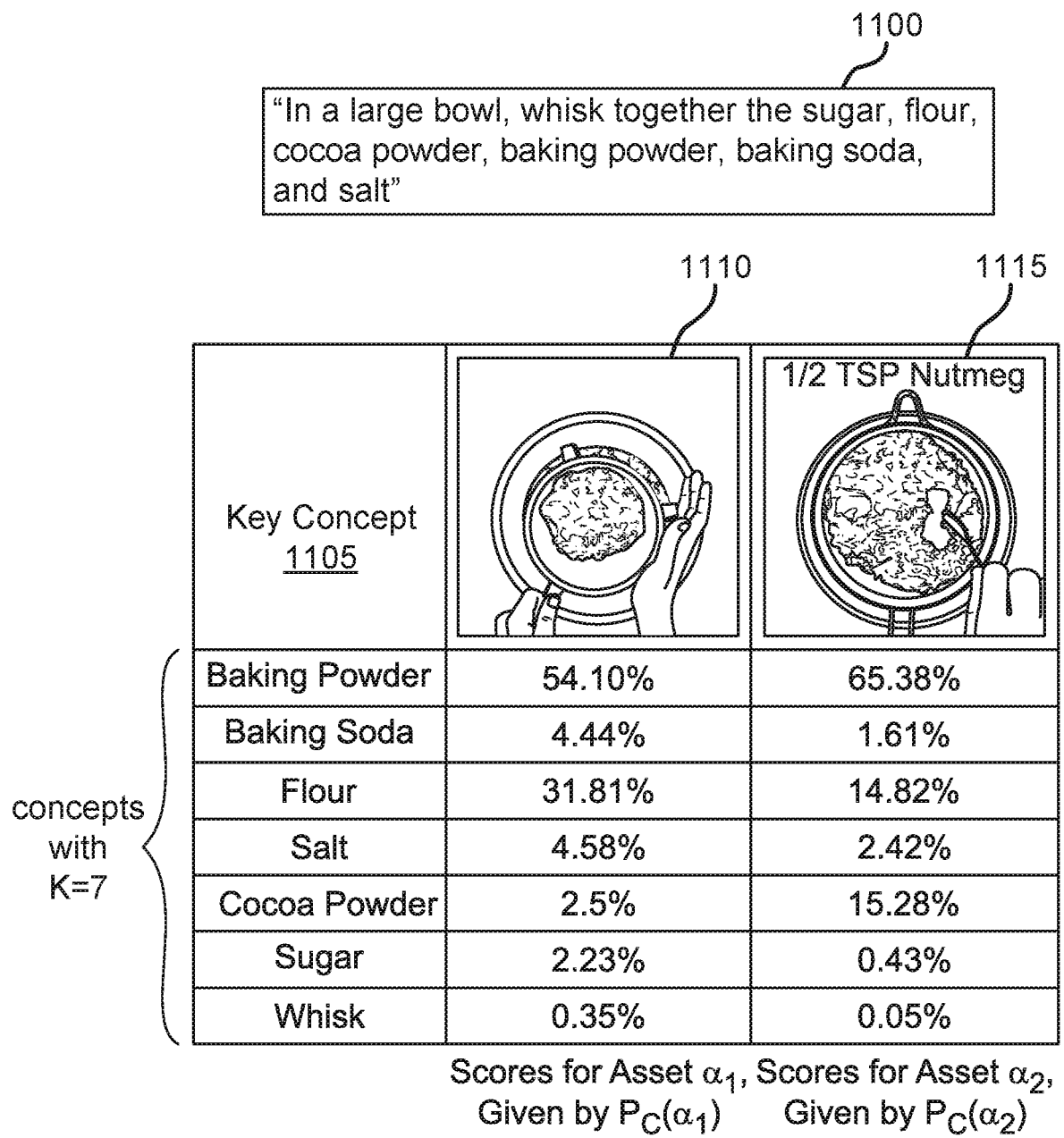
FIG. 11 shows an example of information coverage score according to aspects of the present disclosure.

FIG. 11 shows an example of information coverage score according to aspects of the present disclosure. The example shown includes instruction 1100, key concept 1105, first multi-media asset 1110, and second multi-media asset 1115. Instruction 1100 is an example of, or includes aspects of, the corresponding element described with reference to FIG. 6. FIG. 11 shows an example of using information coverage score for ranking two assets. These assets are retrieved for instruction 1100, which states "in a large bowl, whisk together the sugar, flour, cocoa powder, baking powder, baking soda, and salt".

According to an embodiment, the asset selection component uses information coverage score to rank two retrieved assets. In some examples, the asset selection component extracts key concepts 1105 in instruction 1100 which serves as a reference of different concepts to be covered by the asset combination. K=7 are the number of concepts identified from instruction 1100. $P_c(a_1)$, $P_c(a_2)$ is computed to provide an overview of the content in the image (i.e., first multi-media asset 1110 and second multi-media asset 1115). For example, KL divergence of $a_1$ and $a_2$ can be computed as 0.0028 and 0.0038, respectively. Thus, the asset selection component chooses asset $a_1$ over asset $a_2$. In some examples, asset $a_2$ contains cocoa powder in the bowl and hence gets a higher score for cocoa powder concept (15.28%) whereas asset $a_1$ gets a lower score for cocoa powder concept (2.5%). Additionally, asset $a_1$ has a greater component in the other key concepts such as baking soda, flour, sugar, thus leading to a lower KL divergence value.

Figure 12:
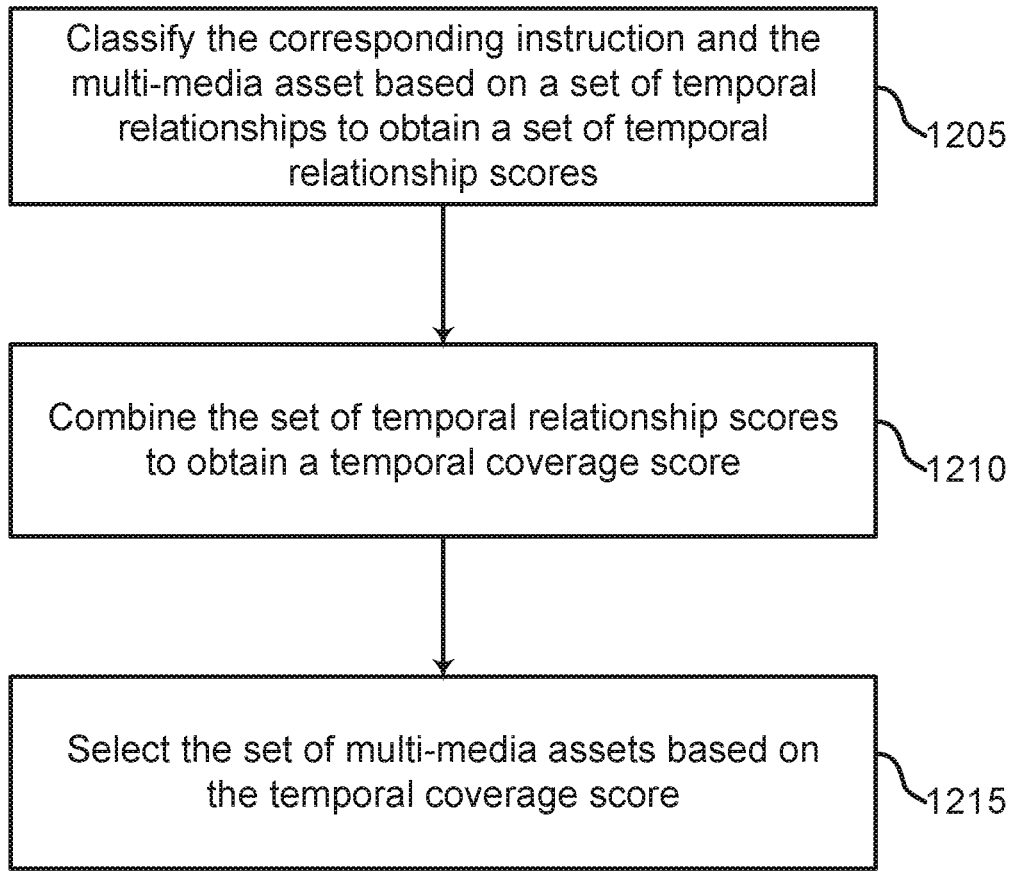
FIG. 12 shows an example of a method for computing a temporal coverage score according to aspects of the present disclosure.

FIG. 12 shows an example of a method for computing a temporal coverage score according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1205, the system classifies the corresponding instruction and the multi-media asset based on a set of temporal relationships to obtain a set of temporal relationship scores. In some cases, the operations of this step refer to, or may be performed by, a temporal classifier as described with reference to FIG. 2.

In a procedural document, the text of an instruction may describe multiple temporal aspects such as process, changes in states of the components, final state that feeds to subsequent instructions, etc. The machine learning model (via a temporal classifier and/or an asset selection component) finds assets for different temporal aspects of the instruction and locates answers to certain "questions" to determine if an image provides sufficient information about the preparation, execution, or results of the accompanying step. In some examples, the machine learning model identifies image-text temporal relationships based on the following questions (the same can be extended to videos as well). First, does the image show how to prepare before carrying out the step? Second, does the image show the results of the action described in the text? Third, does the image depict an action in progress described in the text?

In some examples, the machine learning model obtains true or false responses in a corpus of image-text disclosure relations (i.e., CITE dataset) for these questions. The machine learning model comprises a deep learning network on this dataset configured to capture these temporal image-text relations using CLIP embeddings. The trained network model is run on the retrieved images to obtain the associated confidence scores for each of the questions. For retrieved videos, the network model extracts their keyframes and takes average of the confidence scores of each keyframe as the score for the video. The assets and the associated combinations are scored to get the aggregated scores from the model that indicate the ability to capture different temporal aspects. the machine learning model computes scores corresponding to three temporal aspects (i.e., $s_{bef}$, $s_{aft}$, $s_{dur}$) for each (instruction, retrieved asset) pair.

At operation 1210, the system combines the set of temporal relationship scores to obtain a temporal coverage score. In some cases, the operations of this step refer to, or may be performed by, a temporal classifier as described with reference to FIG. 2.

According to an embodiment, characterization of the temporal aspects into three categories enables personalization following user-preferences. For example, a user looking for a succinct summary of the actions is better served by optimizing the assets for the third question. Similarly, a user preparing for a procedure can be better served by optimizing for the first question. By default, the machine learning model assigns equal weights to the three questions for selections. In some cases, users are provided with the option of weighing temporal aspects according to their preferences.

At operation 1215, the system selects the set of multi-media assets based on the temporal coverage score. In some cases, the operations of this step refer to, or may be performed by, an asset selection component as described with reference to FIGS. 2 and 3.

In some examples, 2-asset and 3-asset combinations are generated for each of the elaborate and succinct variants using $s_{bef}$, $s_{aft}$, $s_{dur}$ scores. In the succinct case, the asset selection component picks the top-k (k=2, 3) assets that rank the highest on the average of the three scores. Higher-ranked assets contain all three temporal aspects, leading to fewer assets that cover a wide information range, thereby catering to user preferences.

In the elaborate case for 3-asset combination, the asset selection component first picks the top-n (n=5) assets that rank the highest in each individual temporal aspect. Next, the asset selection component considers all the $n^3$ combinations of assets and picks the combination that ranks highest on the summation of their temporal aspect scores. In the elaborate case for 2-asset combination, the asset selection component picks the top-n (n=5) assets that jointly rank the highest in two aspects. In some cases, the two aspects are represented as ($[s_{bef}, s_{aft}]$ or $[s_{dur}, s_{aft}]$). The asset selection component iterates over all $n^2$ combinations. The asset selection component picks the asset that ranks the highest on the summation of their joint scores.

Referring to FIG. 6, the asset selection component of video generation apparatus 200 chooses a 3-asset combination for the instruction stating "in a large bowl, whisk together the eggs, water, milk, oil, and vanilla extract". In some cases, the 3-asset combination is chosen for a certain video frame in an elaborate variant. In FIG. 6, elaborate presentation 610 includes three images as a selected set of assets. The top left image of elaborate presentation 610 shows how to prepare before carrying out the step (i.e., corresponding to "before" temporal aspect). The bottom left image of elaborate presentation 610 shows the results of the action described in the instruction (i.e., corresponding to "result" or "after" temporal aspect). The right-hand side image of elaborate presentation 610 depicts an action in progress described in the instruction (i.e., corresponding to "during" temporal aspect).

Figure 13:
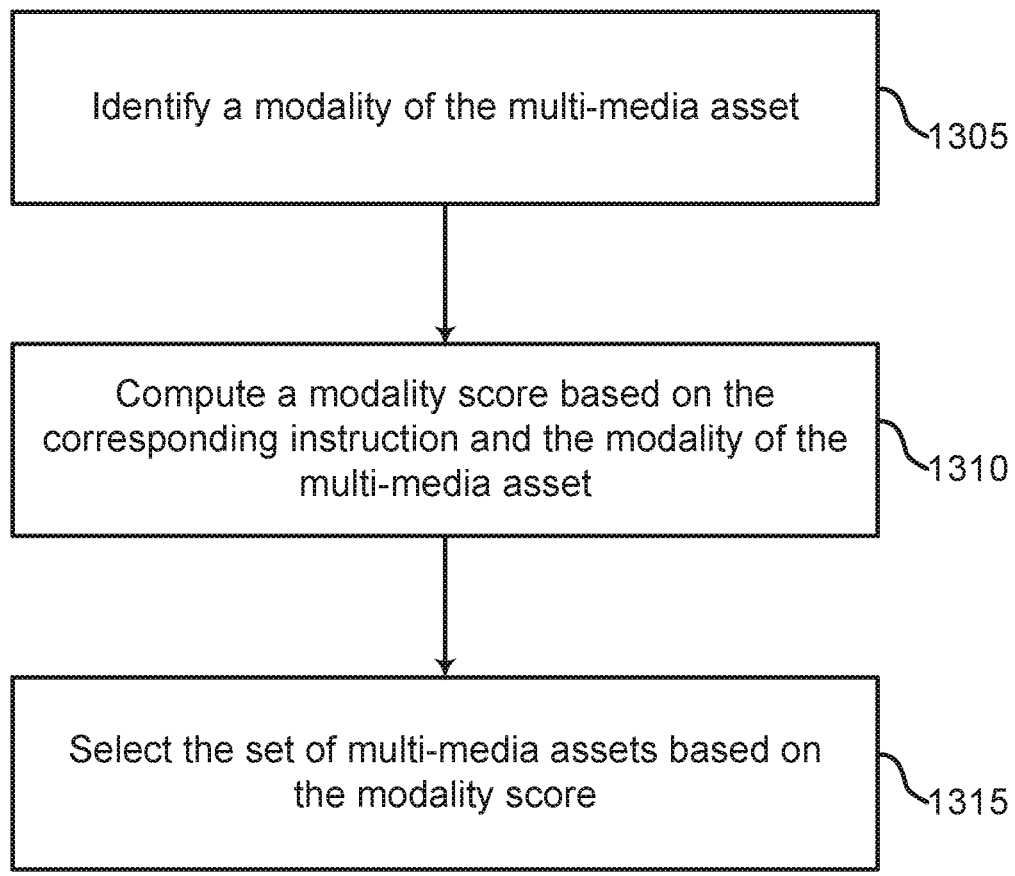
FIG. 13 shows an example of a diagram for computing a modality score according to aspects of the present disclosure.

FIG. 13 shows an example of a method for computing a modality score according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1305, the system identifies a modality of the multi-media asset. In some cases, the operations of this step refer to, or may be performed by, a modality classifier as described with reference to FIG. 2. In some cases, a modality of the multi-media asset can be text, image, image-list, or video. A modality classifier is configured to determine the appropriate modality for each instruction of a procedural document. That is, machine learning model 225 selects a combination of assets whose modalities are fit to represent an instruction of the procedural document.

At operation 1310, the system computes a modality score based on the corresponding instruction and the modality of the multi-media asset. In some cases, the operations of this step refer to, or may be performed by, a modality classifier as described with reference to FIG. 2. The trained modality classifier M is used to predict modality appropriateness scores for each instruction at inference time. In some examples, the model generates a 4-dimensional vector as output with each dimension representing score for the four modalities. Training the modality classifier is described in greater detail in FIG. 15.

At operation 1315, the system selects the set of multi-media assets based on the modality score. In some cases, the operations of this step refer to, or may be performed by, an asset selection component as described with reference to FIGS. 2 and 3.

Figure 14:
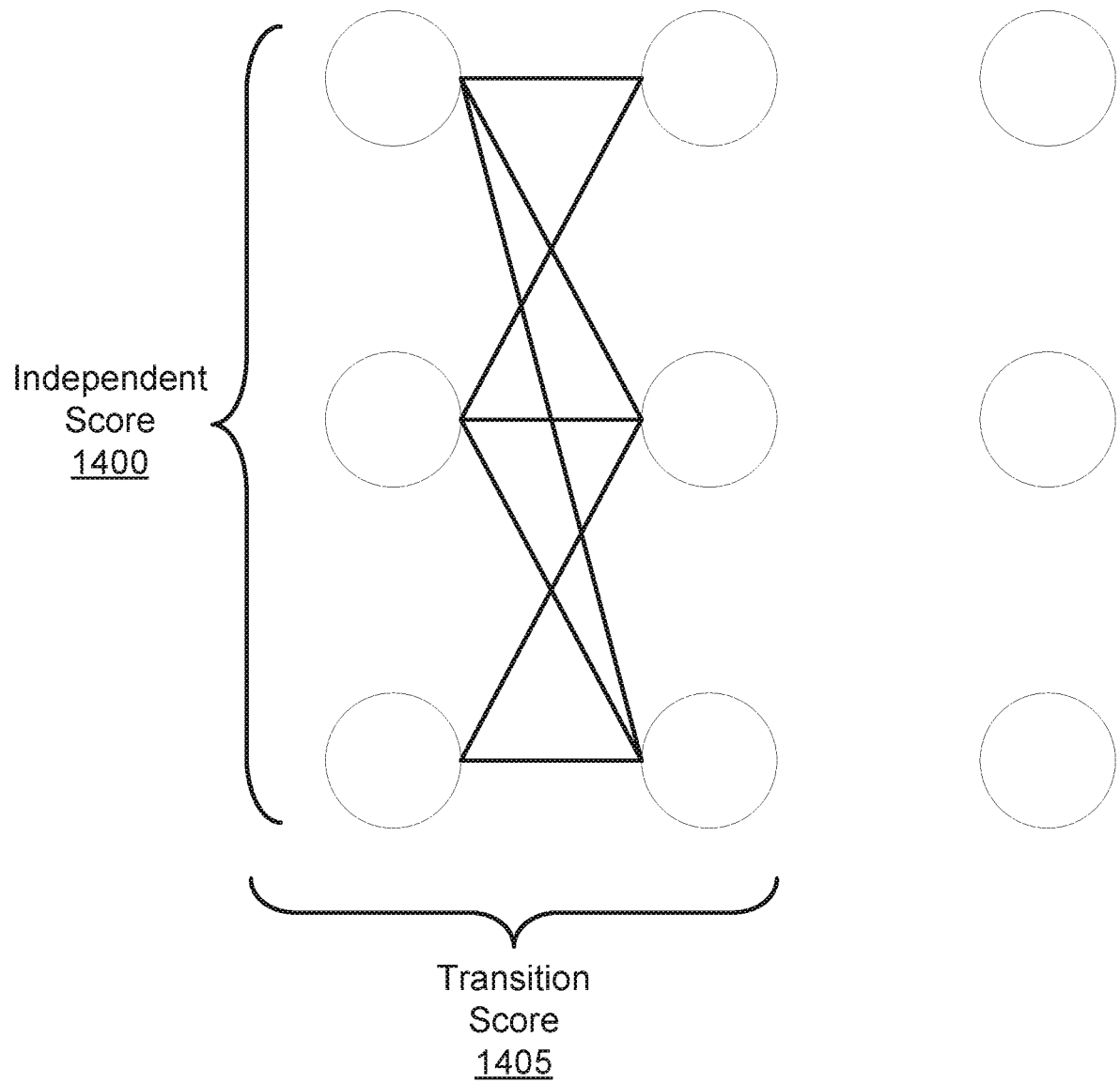
FIG. 14 shows an example of a method for computing transition scores according to aspects of the present disclosure.

FIG. 14 shows an example of a diagram for computing transition scores 1405 according to aspects of the present disclosure. The example shown includes independent score 1400 and transition score 1405. In some examples, referring to FIG. 8 and accompanying description, machine learning model 225 computes independent score 1400 for each asset y, S(y). Machine learning model 225 computes transition scores 1405 for assets between consecutive instructions $T(y_i, y_{i+1})$ Training and Evaluation In FIGS. 15-16, a method, apparatus, and non-transitory computer readable medium for training a machine learning model are described. One or more embodiments of the method, apparatus, and non-transitory computer readable medium include receiving a training set comprising a procedural document, wherein the procedural document comprises a plurality of instructions; applying a plurality of heuristic labeling functions to the training set to obtain heuristic label data; classifying each of the plurality of instructions using a modality classifier to obtain predicted label data; comparing the predicted label data to the heuristic label data; and updating parameters of the modality classifier based on the comparison of the predicted label data and the heuristic label data.

In some examples, the plurality of heuristic labeling functions includes an action type labeling function, an action count labeling function, a text length labeling function, a numerical quantity labeling function, or any combination thereof.

Some examples of the method, apparatus, and non-transitory computer readable medium further include receiving a temporal training set comprising ground-truth labels for a plurality of temporal relationships between actions and multi-media assets. Some examples further include predicting temporal labels for the plurality of instructions and a plurality of multi-media assets using a temporal classifier. Some examples further include comparing the predicted temporal labels to the ground-truth labels. Some examples further include updating parameters of the temporal classifier based on the comparison of the predicted temporal labels and the ground-truth labels.

Figure 15:
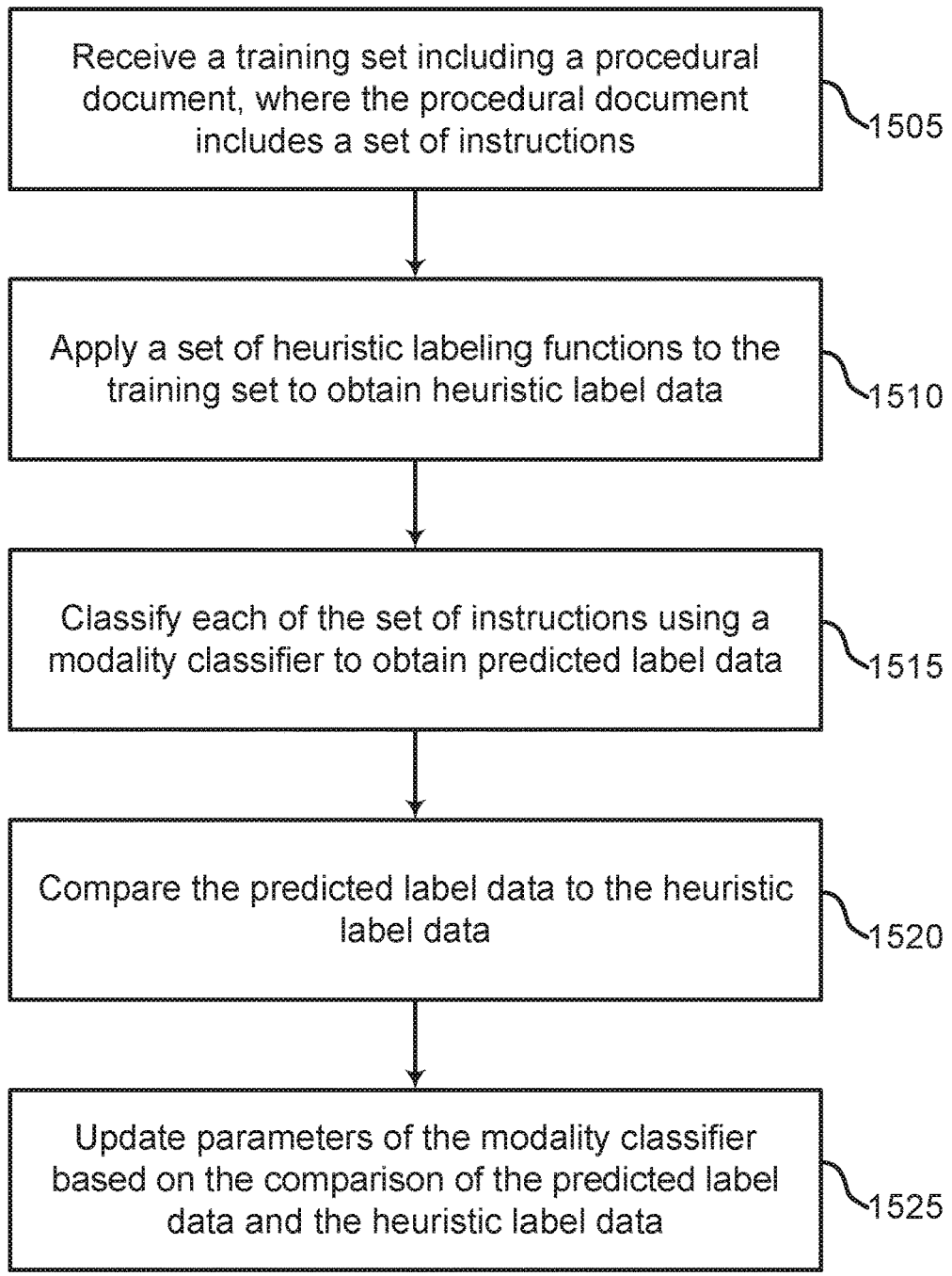
FIG. 15 shows an example of a method for training a modality classifier of a machine learning model according to aspects of the present disclosure.

FIG. 15 shows an example of a method for training a modality classifier of a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

According to some embodiments, weak supervision is used to train modality classifier 245 of machine learning model 225 (see FIG. 2). Weak supervision focuses on capturing supervisory signals from humans at a higher level such as heuristics, constraints, or data distributions. Given an unlabeled dataset, similar to instructions, weak supervision enables programmatic creation of labels for the dataset via labelling functions. For example, multiple labelling functions (LFs) are implemented based on cognitive models for procedural text understanding that capture domain expertise and simple intuitions of human annotator behavior. Each labelling function labels a subset of the data, and multiple labelling functions ensure that a large proportion of data is labelled imparting high coverage. A single data point can be labelled by multiple labelling functions, thus reducing noise and making the process robust.

At operation 1505, the system receives a training set including a procedural document, where the procedural document includes a set of instructions. In some cases, the operations of this step refer to, or may be performed by, a training component as described with reference to FIG. 2.

At operation 1510, the system applies a set of heuristic labeling functions to the training set to obtain heuristic label data. In some cases, the operations of this step refer to, or may be performed by, a training component as described with reference to FIG. 2. In some examples, four type of labelling functions are used to compute models for modality appropriateness scores. The labelling functions are general because they depend on common properties such as count of actions, instruction length, etc.

According to an embodiment, the set of heuristic labeling functions includes an action type labeling function. Action verbs are identified from a given instruction and action verbs are classified into multiple categories based on inductive biases and cognitive studies. The categories are then mapped to the appropriate modality. For example, one-time actions are mapped to image modality (i.e., "bake in oven" or "heat the oil" for recipes). Additionally, general actions are mapped to textual modality since they do not require any visual guidance (e.g., "leave for five minutes" in recipes). In some cases, repetitive actions are mapped to short illustrative video modality such as "whisking", "spooning" in recipes, etc. Complex actions with two or more action verbs are mapped to longer illustrative video modality (e.g., "sealing edges by pressing onto the seams of fish silhouette" in recipes).

According to an embodiment, the set of heuristic labeling functions includes an action count labeling function. In some examples, instructions containing multiple verbs may not be illustrated with a single image or multiple images. To encode this, a labelling function is implemented where the labelling function assigns a video label for instruction that contains action count above a threshold.

According to an embodiment, the set of heuristic labeling functions includes a text length labeling function. Lengthy instructions include significant cognitive burden and the users have to keep track of progress over a long duration. Illustrative videos offer a self-correction mechanism by helping users compare their outputs with the synthesized video outputs. Thus, the machine learning model labels instructions above a threshold length with video modality.

According to an embodiment, the set of heuristic labeling functions includes a numerical quantity labeling function. Quantitative information, for example, "3 spoons of sugar", "some wheat flour" in recipes can be illustrated better via text because it provides users with immediate actionable knowledge of the material to collect. Hence, the machine learning model identifies if an instruction contains any numerical quantifier and labels with text modality.

In some examples, labelling functions cover the instruction dataset via a coverage metric provided by Snorkel library. A majority label consensus method is used to resolve conflicts when different labelling functions label an instruction differently. Majority consensus method also serves as a denoiser to weak labelling. Thus, a weak-labelled dataset contains textual instruction data mapped to one of the four labels. In some cases, the labels include text, image, image-list, and video that indicate an appropriate modality for each corresponding instruction. This dataset acts as a proxy for a human-annotated modality appropriateness dataset. Next, a multi-class classifier (i.e., modality classifier 245) is trained on CLIP-text embeddings of instructions. Modality classifier 245 learns the connections between modality type and instructions represented in a high-dimensional space based in part on inductive biases.

At operation 1515, the system classifies each of the set of instructions using a modality classifier to obtain predicted label data. In some cases, the operations of this step refer to, or may be performed by, a modality classifier as described with reference to FIG. 2.

At operation 1520, the system compares the predicted label data to the heuristic label data. In some cases, the operations of this step refer to, or may be performed by, a training component as described with reference to FIG. 2.

Training input data X is of shape (N, D) with N=45616 representing the number of instruction data points, and D=512 representing the CLIP-text embedding dimension. Training output data Y is of shape (N, L) with L=4 representing the four possible modalities. In some examples, Y is a one-hot label matrix with one element of each row taking the value of 1. Next, a cross-entropy loss function is used to train the modality classifier, i.e., model M:

$$L(c) = -\Sigma_i Y_i(c) \log(\hat{Y}_i(c)) \quad (4)$$

where $\hat{Y}_i$=softmax(M(et)), and c is the class (label).

The training component sums the loss over all datapoints (i) and all classes. The training component assigns equal weight to each label. Some examples have a test accuracy of 85%. Additionally, test data is generated with the same weak labelling technique (i.e., human annotation is not used).

At operation 1525, the system updates parameters of the modality classifier based on the comparison of the predicted label data and the heuristic label data. In some cases, the operations of this step refer to, or may be performed by, a training component as described with reference to FIG. 2. The trained modality classifier M predicts modality appropriateness scores for each instruction at inference time. In some examples, the modality classifier generates a 4-dimensional vector as output with each dimension representing score for the four modalities.

Figure 16:
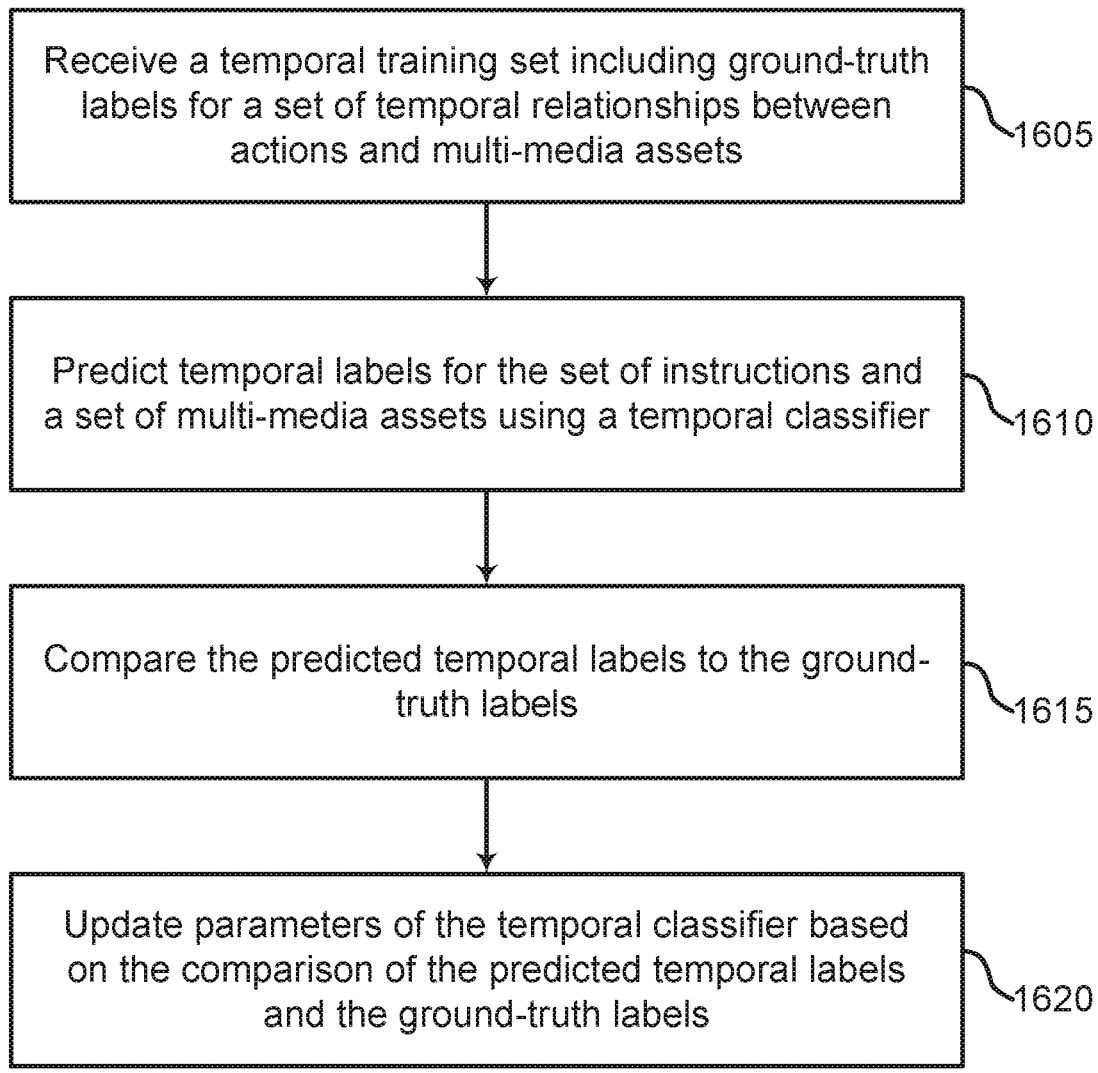
FIG. 16 shows an example of a method for training a temporal classifier of a machine learning model according to aspects of the present disclosure.

FIG. 16 shows an example of a method for training a temporal classifier of a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1605, the system receives a temporal training set including ground-truth labels for a set of temporal relationships between actions and multi-media assets. In some cases, the operations of this step refer to, or may be performed by, a training component as described with reference to FIG. 2.

At operation 1610, the system predicts temporal labels for the set of instructions and a set of multi-media assets using a temporal classifier. In some cases, the operations of this step refer to, or may be performed by, a temporal classifier as described with reference to FIG. 2. The temporal classifier determines asset-instruction (e.g., image-text) temporal relationships based on determining the following questions. Same method can be applies video. First, whether or not the image shows how to prepare before carrying out the step; Second, whether or not the image shows the results of the action described in the text. Third, whether or not the image depicts an action in progress described in the text. In some examples, the temporal classifier is configured to capture these temporal image-text relations using CLIP embeddings.

The temporal classifier computes scores corresponding to three temporal aspects (i.e., $s_{bef}$, $s_{aft}$, $s_{dur}$) for each (instruction, retrieved asset) pair. In some examples, the temporal aspects include "before", "during", and "after" with regards to an instruction of a procedural document. The "after" temporal aspect is also known as "result" after performing a step.

At operation 1615, the system compares the predicted temporal labels to the ground-truth labels. In some cases, the operations of this step refer to, or may be performed by, a training component as described with reference to FIG. 2.

At operation 1620, the system updates parameters of the temporal classifier based on the comparison of the predicted temporal labels and the ground-truth labels. In some cases, the operations of this step refer to, or may be performed by, a training component as described with reference to FIG. 2.

Performance of apparatus, systems and methods of the present disclosure have been evaluated, and results indicate embodiments of the present disclosure have obtained increased performance over existing technology. Example experiments demonstrate that video generation apparatus 200 of the present disclosure outperforms conventional systems.

In some cases, evaluating synthesized videos considering the overall consumption experience of users depend on user annotated data. Evaluation metrics are implemented to capture specific aspects of video generation apparatus 200. Consider two datasets for evaluation (1) RecipeQA test set contains 960 instructional recipe texts along with a few task-specific question-answer pairs; (2) Tasty Videos contains 1000 instructional recipe texts along with recipe categories. For each recipe text, video generation apparatus 200 synthesizes two video variants (elaborate, succinct). Conventional models fail to consider semantic video variants to meet user constraints such as elaborate video or succinct video. Conventional models synthesize video variants by changing templates or speeding up videos. That is, there is no semantic change in the content across variants (slow version vs. speed-up version).

The synthesized video or multi-media presentation is an improved way to consume procedural texts than consuming a textual document modality by itself. Some experiments thus compute values on the input documents for all the metrics to serve as a comparison between videos and text documents. Note not all metrics can be computed for text documents (such as visual relevance). A set of standard metrics are used to capture different aspects of methods described in the present disclosure. The standard metrics also relate to the cognitive model of procedural text understanding. The metrics for evaluation is described in more detail below.

First, visual relevance (for RecipeQA) measures how visually close the assets in synthesized videos are to the input document. Some examples take pairwise cosine similarity of ViT-32 representations of assets and input document images and average over all videos. Note that the document images are not sent as input to the video generation system and are used only for evaluation. A high value shows that video generation apparatus 200 transforms the procedure to a visual form that provides a distinct yet relevant information source to the user.

Second, textual relevance measures how verbally close the assets in synthesized videos are to the input document. Some examples take pairwise cosine similarity of sentence BERT representations of video text and input document text and average over all videos. Video text is obtained using dense captioning of keyframes. A high value shows that video generation apparatus 200 retains the verbal information of the procedure, and the assets are not obfuscating the verbal source to the user.

Third, action coverage measures the number of verbs in the input document that are visually encoded in the final video. Some examples count the number of verbs in the final video using dense captioning and take a ratio with the input document's verbs. A high value shows that video generation apparatus 200 encodes behavioral verbs into a visual performance, thus providing users with a self-correcting mechanism.

Fourth, abrupt information gain measures the abruptness of information gained after each frame in the video. Some examples calculate the distance between consecutive encoded representations of each frame and average over the video. A high standard deviation of these distances indicates that the information conveyed to the user over the duration of the video is not smooth, thereby increasing cognitive load. A low standard deviation indicates a coherent consumption experience to the user with new information being provided smoothly. Mathematically, this abruptness is calculated as follows:

$$\sqrt{\frac{\sum_{t=1}^{N}(d_t - \hat{d})^2}{N}},$$

where $d_t = 1 - f_t^T f_{t-1}$ and $\hat{d} = \Sigma_{t-1}^{N} d_t/N$, where N is the number of frames and $f_t$ is the encoded representation of the frame at timestamp t.

Fifth, summarization score measures the ability of the synthesized videos to convey the same overall summary that the input document conveys. Some examples compute the sentence embeddings of input document and video text (from dense captions of few key frames) and take the cosine similarity of all possible sentence combinations in each domain. An algorithm such as LexRank can then be used to find the most central sentences which represent the extracted summaries. Comparing the summaries of input document with video summaries, video generation apparatus 200 obtains the required score. A high value of summarization score indicates that the synthesized videos maintain sufficient detail when a user glances for a quick summary.

A common evaluation technique in unsupervised representation learning is to check the performance of representations in solving downstream tasks, because there is no supervised data available to compute test set accuracies. The capabilities of the synthesized videos are evaluated on various downstream tasks in addition to the evaluation and metrics mentioned above. Some examples consider the following downstream tasks, based on the side information available in each of the datasets. Note video generation apparatus 200 is not explicitly trained to perform well on these tasks. Instead, the hypothesis is that representations from video generation apparatus 200 are strong enough to effectively solve these tasks unlike other textual or baseline representations.

Given a context and a set of question images, the visual coherence task is to predict which image out of four available options relates to the question images. Some examples vary the context to compare to the baselines. For videos, some examples compute the average of frame representations and concatenate them to ViT-32 representations of both question images and option images. Dimensionality of these representations are then reduced using singular value decomposition (SVD) and cosine similarity is computed. Some examples thereby predict the option that has the highest similarity with the set of question images.

Given a context and a sequence of images with a placeholder, the visual cloze task is to predict which image out of four available options fits well in the placeholder position. Some examples vary the context across baselines and compute SVD representations as described earlier. Some examples then replace the placeholder position with each of the option images and predict the option that leads to the lowest abruptness in information gain across the ordering.

Given a context and a sequence of texts with a placeholder, the textual cloze task is to predict which text out of four available options fits well in the placeholder position. Some examples follow the previous computations replacing the frame representations with BERT representations. Note that both cloze tasks not only capture the representative strength of videos but also the strength of sequential information encoded in them.

Fourth, category prediction (for Tasty Videos). Each procedural text in this dataset comes with a set of categories. Some examples predict categories from the context (varied across baselines). Some examples measure the performance using multi-label accuracy, i.e., taking the set intersection of true labels and top-10 labels with the highest similarity scores. The 51 available unique labels are reduced to 10 commonly occurring labels and add an extra "Other" label for the other 41 categories.

The description and drawings described herein represent example configurations and do not represent all the implementations within the scope of the claims. For example, the operations and steps may be rearranged, combined, or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for video processing, comprising:

receiving a procedural document comprising a plurality of instructions;

extracting a plurality of key concepts for an instruction of the plurality of instructions;

computing an information coverage distribution for each of a plurality of candidate multi-media assets, wherein the information coverage distribution indicates whether a corresponding multi-media asset relates to each of the plurality of key concepts of the instruction;

classifying the instruction and the corresponding multi-media asset based on a plurality of temporal relationships between the instruction and the corresponding multi-media asset to obtain a plurality of temporal relationship scores;

combining the plurality of temporal relationship scores to obtain a temporal coverage score;

selecting a set of multi-media assets for the instruction based on the information coverage distribution and the temporal coverage score; and generating a multi-media presentation describing the procedural document by combining the set of multi-media assets based on a presentation template.

2. The method of claim 1, further comprising:
retrieving the plurality of candidate multi-media assets from a database containing a collection of multi-media assets, wherein the set of multi-media assets is selected from the plurality of candidate multi-media assets.

3. The method of claim 2, further comprising:
generating an indexing vector for a description text of each corresponding multi-media asset in the collection of multi-media assets to obtain an indexed description text, wherein the indexing vector indicates a presence of each word from a collection of words corresponding to the collection of multi-media assets;

indexing the description text based on the indexing vector; and weighting each multi-media asset in the collection of multi-media assets, wherein the plurality of candidate multi-media assets is selected based on the weighted multi-media asset.

4. The method of claim 2, further comprising:
encoding procedural text from the procedural document to obtain encoded procedural text;

encoding a description text for each multi-media asset in the collection of multi-media assets to obtain encoded description text; and comparing the encoded procedural text to the encoded description text, wherein the plurality of candidate multi-media assets is selected based on the comparison.

5. The method of claim 2, further comprising:
encoding procedural text from the procedural document to obtain encoded procedural text;

encoding each multi-media asset in the collection of multi-media assets to obtain an encoded multi-media asset; and comparing the encoded procedural text to the encoded multi-media asset, wherein the plurality of candidate multi-media assets is selected based on the comparison.

6. The method of claim 1, further comprising:
identifying a set of text delimiters; and
applying a keyword extraction algorithm to the instruction based on the set of text delimiters to obtain the plurality of key concepts.

7. The method of claim 1, further comprising:
encoding each key concept of the plurality of key concepts to obtain a plurality of encoded key concepts;

encoding a multi-media asset to obtain an encoded multi-media asset; and computing a similarity value between the encoded multi-media asset and each of the plurality of encoded key concepts to obtain a plurality of concept relevance scores for the multi-media asset, wherein the information coverage distribution is based on the plurality of concept relevance scores.

8. The method of claim 7, further comprising:
computing an aggregate relevance score for the multi-media asset based on the plurality of concept relevance scores, wherein the set of multi-media assets is selected based on the aggregate relevance score.

9. The method of claim 7, further comprising:
computing an information coverage score based on a divergence of the plurality of concept relevance scores, wherein the set of multi-media assets is selected based on the information coverage score.

10. The method of claim 1, further comprising:
identifying a modality of the corresponding multi-media asset; and computing a modality score based on the instruction and the modality of the corresponding multi-media asset, wherein the set of multi-media assets is selected based on the modality score.

11. The method of claim 1, further comprising:
computing a semantic similarity score between the instruction and a subsequent instruction, wherein the set of multi-media assets is selected based on the semantic similarity score.

12. The method of claim 1, further comprising:
converting the instruction to an audio clip, wherein the multi-media presentation includes the audio clip.

13. The method of claim 1, further comprising:
identifying a plurality of presentation templates;
selecting the presentation template from the plurality of presentation templates based on the set of multi-media assets; and arranging the set of multi-media assets to obtain an instruction frame, wherein the multi-media presentation includes the instruction frame.

14. An apparatus for video processing, comprising:
a multi-modal encoder configured to encode multi-media assets and instructions from a set of procedural documents;

a key concept extraction component configured to extract key concepts from the instructions;

an asset selection component configured to compute an information coverage distribution that indicates whether a corresponding multi-media asset of the multi-media assets relates to each of the key concepts in a corresponding instruction and to select a set of multi-media assets for each of the instructions to obtain a plurality of sets of multi-media assets;

a temporal classifier configured to classify the corresponding instruction and the corresponding multi-media asset based on a plurality of temporal relationships to obtain a plurality of temporal relationship scores, wherein the asset selection component is configured to combine the plurality of temporal relationship scores to obtain a temporal coverage score; and a presentation component configured to generate a multi-media presentation by combining the plurality of sets of multi-media assets based on a presentation template.

15. The apparatus of claim 14, further comprising:
a modality classifier configured to compute a plurality of modality values for the corresponding instruction, wherein the asset selection component is configured to compute a modality score for the corresponding multi-media asset based on the plurality of modality values.

16. An apparatus comprising:
at least one processor; and
at least one memory including code executable by the at least one processor to:
encode multi-media assets and instructions from a set of procedural documents;
extract key concepts from the instructions;

compute an information coverage distribution that indicates whether a corresponding multi-media asset of the multi-media assets relates to each of the key concepts in a corresponding instruction and select a set of multi-media assets for each of the instructions to obtain a plurality of sets of multi-media assets;

classify the corresponding instruction and the corresponding multi-media asset based on a plurality of temporal relationships to obtain a plurality of temporal relationship scores;

combine the plurality of temporal relationship scores to obtain a temporal coverage score; and generate a multi-media presentation by combining the plurality of sets of multi-media assets based on a presentation template.

17. The apparatus of claim 16, further comprising code executable by the at least one processor to:

compute a plurality of modality values for the corresponding instruction; and compute a modality score for the corresponding multi-media asset based on the plurality of modality values.

* * * * *